United States Patent
Bastholm et al.

(10) Patent No.: US 11,381,180 B2
(45) Date of Patent: Jul. 5, 2022

(54) LINEAR ACTUATOR WITH AN END STOP SWITCH

(71) Applicant: LINAK A/S, Nordborg (DK)

(72) Inventors: Jeppe Christian Bastholm, Sønderborg (DK); Christian Tjønelund Ahler, Sønderborg (DK)

(73) Assignee: Linak A/S, Nordborg (DK)

( * ) Notice: Subject to any disclaimer, the term of this patent is extended or adjusted under 35 U.S.C. 154(b) by 321 days.

(21) Appl. No.: 16/639,650

(22) PCT Filed: Aug. 23, 2018

(86) PCT No.: PCT/DK2018/000071
§ 371 (c)(1),
(2) Date: Feb. 17, 2020

(87) PCT Pub. No.: WO2019/037823
PCT Pub. Date: Feb. 28, 2019

(65) Prior Publication Data
US 2020/0177112 A1 Jun. 4, 2020

(30) Foreign Application Priority Data
Aug. 23, 2017 (DK) .......................... PA 2017 00459

(51) Int. Cl.
*H02P 3/12* (2006.01)
*H02P 7/03* (2016.01)
(Continued)

(52) U.S. Cl.
CPC ........... *H02P 3/12* (2013.01); *F16H 25/2015* (2013.01); *F16H 25/24* (2013.01); *H02P 3/04* (2013.01);
(Continued)

(58) Field of Classification Search
CPC ................. H02P 3/12; H02P 3/04; H02P 7/04
(Continued)

(56) References Cited

U.S. PATENT DOCUMENTS

| 4,639,653 A | 1/1987 | Anderson et al. |
| 9,484,827 B2 * | 11/2016 | Bastholm .......... H02M 3/33569 |
| 2009/0193917 A1 | 8/2009 | Knudsen |

FOREIGN PATENT DOCUMENTS

| EP | 647799 B1 | 9/1998 |
| EP | 2002148 B2 | 4/2014 |

(Continued)

OTHER PUBLICATIONS

EE StackExchange: "Calculate Charge Time of Capacitor with Current Limiting Power Supply", Aug. 30, 2013 (Aug. 30, 2013), XP0555256209, retrieved from the Internet: URL:https://electronics.stackexchange.com/questions/80737/calculate-charge-time-of-capacitor-with-current-limiting-power-supply [retrieved on Nov. 21, 2018] p. 1, paragraph bottom-part; figure at p. 1.

*Primary Examiner* — David Luo
(74) *Attorney, Agent, or Firm* — Dykema Gossett PLLC

(57) ABSTRACT

A linear actuator (1) comprises a spindle nut arranged to be moved between two end positions on a spindle driven by a DC motor (2). An end stop switch (31) is arranged to be activated when the spindle nut is in an end position. In its activated state, the end stop switch disconnects the motor current and connects a first diode (33) across the DC motor for short circuiting the motor when the current is interrupted. A second diode (32) is connected over the end stop switch for enabling the DC motor to drive the spindle nut out of said end position. An additional component (43) in series with the first diode reduces noise problems caused by motor current circulating through this diode during pulse pauses while the spindle nut is driven out of an end position by a (Continued)

pulse width modulated voltage via a cable from a control box.

11 Claims, 16 Drawing Sheets

(51) Int. Cl.
    *F16H 25/20*     (2006.01)
    *F16H 25/24*     (2006.01)
    *H02P 3/04*     (2006.01)
    *F16D 121/24*     (2012.01)

(52) U.S. Cl.
    CPC ............ *H02P 7/04* (2016.02); *F16D 2121/24* (2013.01); *F16H 2025/2084* (2013.01)

(58) Field of Classification Search
    USPC .................................................. 318/256, 255
    See application file for complete search history.

(56) References Cited

FOREIGN PATENT DOCUMENTS

| | | |
|---|---|---|
| GB | 2307118 A | 5/1997 |
| WO | 2009/155922 A1 | 12/2009 |
| WO | 2012/083951 A1 | 6/2012 |

* cited by examiner

LINEAR ACTUATOR WITH AN END STOP SWITCH

CROSS-REFERENCE TO RELATED APPLICATIONS

This application is a national stage filing based upon international application no. PCT/DK2018/000071, filed 23 Aug. 2018 (the '071 application), and published in English on 28 Feb. 2019 under international publication no. WO 2019/037823 A1, which claims priority to Denmark (DK) patent application no. PA 2017 00459, filed 23 Aug. 2017 (the '459 application). The '071 application and the '459 application are both hereby incorporated by reference as though fully set forth herein.

TECHNICAL FIELD

The invention relates to a linear actuator having at least one end stop switch arranged to be activated when a spindle nut is in an end position and to an actuator system comprising a linear actuator.

BACKGROUND

Linear actuators are devices for transforming a rotational movement of typically an electric motor into a linear movement of a mechanical equipment, and a linear actuator normally comprises a reversible electric motor, a transmission or reduction gear, typically with several stages, a spindle, a spindle nut and in some cases an activation element. The spindle nut is secured against rotation. When the spindle is rotated by the motor, the spindle nut moves along the spindle, thus transforming the rotation into a linear movement of the spindle nut and/or the activation element between two end positions. Although other types of electric motors may be used, the reversible electric motor is typically a reversible electric DC motor.

Linear actuator systems are used in many different applications, such as trucks, agricultural machinery, industrial automation equipment, hospital and care beds, leisure beds and chairs, tables or other articles of furniture with adjustable height and several other similar applications.

In many of these applications, an actuator system is used in which the linear actuator is connected via a cable to a control box that comprises at least a driver circuit and a power supply. The control box is normally placed on the equipment on which the linear actuator is used. The cable between the driver circuit and the linear actuator may have a length of up to two meters or more, and typically, an unshielded cable type is used for economic reasons.

The driver circuit is typically an H bridge driver circuit comprising four electronic switches that allow each motor terminal to be connected either to a positive supply voltage or to a ground terminal or negative supply voltage, so that the motor rotates in one direction when two of the switches are closed, and in the other direction when the two other electronic switches are closed.

The motor speed can either be controlled by adjusting the DC voltage level supplied to the driver circuit, or pulse width modulation (PWM) can be used, where the motor speed is instead controlled by adjusting the duty cycle of the pulse width modulation. The present application relates to situations where pulse width modulation is used.

As mentioned above, the spindle nut and/or the activation element can be moved between two end positions. Typically, an end stop switch is activated by the spindle nut or the activation element when an end position has been reached in order to disconnect the drive current. Otherwise, an undesired tightening of the spindle nut might occur, which would require a large force to undo, and furthermore a large increase in the drive current would take place and overload of the drive mechanism in general.

Examples of end stop switches are known from e.g. EP 647 799, EP 2 002 148, WO 2009/155922 and WO 2012/083951, all to Linak A/S.

The end stop switch may either provide a signal to the driver circuit in the control box indicating that the motor current should be interrupted, or it may function directly as a circuit breaker for the motor current. In the latter case, the end stop switch is connected in series with the motor in the linear actuator, so that the motor current is interrupted when the end stop switch is activated.

In some implementations of a linear actuator, a "restart" diode may be connected in parallel to the end stop switch to be able to drive the spindle nut out of the end position again. The "restart" diode is arranged in a direction allowing the driver circuit to drive the motor with a current in the opposite direction of the one that was interrupted by the end stop switch.

Further, to ensure that the motor stops as fast as possible when the motor current is interrupted by the end stop switch, the end stop switch may also be arranged to connect a "short circuit" diode across the motor, so that the current generated by the back electromotive force (back EMF) generated by the motor can be short circuited.

Although this circuit allows the motor to be stopped fast when the end stop switch interrupts the motor current and then to be started again in the opposite direction to drive the spindle nut out of the end position again, the circuit may cause electric noise to be generated in the situation where the motor is controlled by a pulse width modulated voltage while driving the spindle nut out of the end position. The generation of the electric noise is related to the fact that in this situation, the "short circuit" diode is still connected across the motor through the end stop switch. During the pulses of the pulse width modulated voltage the diode blocks the voltage, but during the pauses between the pulses the diode may conduct at least a part of the current that continues to circulate through the motor. However, at the beginning of each pulse, it takes a short time, the reverse recovery time, before the diode enters its blocking state again. In this short time the diode more or less short circuits the voltage, which generates a current spike through the diode.

SUMMARY

Therefore, it is an object of embodiments of the invention to provide a linear actuator that can reduce or avoid the generation of the above-mentioned electric noise when the spindle nut is driven out of an end position by a pulse width modulated voltage delivered to the actuator via a cable from a control box.

According to embodiments of the invention the object is achieved with a linear actuator comprising a reversible electric DC motor; a spindle driven by said reversible DC motor; a spindle nut mounted on the spindle and secured against rotation, said spindle nut being arranged to be moved between two end positions; at least one end stop switch arranged to be activated when the spindle nut is in an end position, wherein the end stop switch in its activated state is configured to disconnect the current for the DC motor and to connect a first diode across the DC motor for short circuiting a current resulting from a back electromotive force produced by the DC motor, when the motor current is interrupted; a second diode connected over said end stop switch for enabling the DC motor to drive the spindle nut out of said end position; and at least one additional component connected in series with said first diode so that the additional component can conduct a current in the same direction as the first diode while providing a voltage drop over itself.

The additional component in series with the first diode, i.e. the diode for short circuiting the DC motor when the motor current is interrupted by the end stop switch, reduces or even eliminates the part of the motor current circulating through this diode during pulse pauses while the spindle nut is driven out of an end position by a pulse width modulated voltage delivered to the actuator via a cable from a control box. The reduced or eliminated current in the first diode during pulse pauses reduces or eliminates the effect of the reverse recovery time of the diode, so that current spikes caused by this effect and the related electric noise problems are also reduced or eliminated.

In an embodiment, the additional component is a component configured to provide a voltage drop over itself when conducting current that at least corresponds to one diode voltage drop. In this way, the additional component at least compensates for a corresponding diode voltage drop in the alternative path for the circulating motor current through a cable and a control box. This can be achieved when the additional component is a diode, a Zener diode, a bipolar transistor having its base and collector terminals connected together, or a field effect transistor having its gate and source terminals connected together.

In this case, the effect of the current spikes caused by the reverse recovery time of the first diode can be further reduced when an inductor is connected in series with said first diode and said additional component. The inductor may have a self-inductance in the range 1-100 µH, such as 10 µH.

In an embodiment, the additional component is an inductor. This reduces the level of the current spikes and thus the related electric noise problems. The inductor may have a self-inductance in the range 1-100 µH, such as 10 µH.

In an embodiment, the additional component is a field effect transistor having its drain terminal connected to a first end of said first diode and its gate terminal connected to a midpoint of an RC circuit, wherein the RC circuit comprises a capacitor connected to the source terminal of the field effect transistor and a resistor connected to the other end of said first diode. This circuit prevents the first diode from conducting any current during the pulse pauses while the spindle nut is driven out of an end position, and thus no current spikes are generated. The RC circuit may be designed with a time constant in the range of 100 µs to 1 ms.

The linear actuator may comprise a first end stop switch arranged to be activated when the spindle nut is in one of the two end positions and a second end stop switch arranged to be activated when the spindle nut is in the other end position, wherein each end stop switch in its activated state is configured to disconnect the current for the DC motor and to connect a first diode across the DC motor for short circuiting a current resulting from a back electromotive force produced by the DC motor when the motor current is interrupted; a second diode connected over each of said end stop switches for enabling the DC motor to drive the spindle nut out of said end position, and at least one additional component connected in series with each one of said first diodes so that the additional component can conduct a current in the same direction as the first diode while providing a voltage drop over itself. In this way, the electric noise problem can be solved in both end positions of the spindle nut.

An actuator system may comprise a linear actuator as described above; a control box comprising at least a power supply and a driver circuit comprising four electronic switches arranged as a H bridge, said driver circuit being configured to drive the DC motor of the linear actuator with a pulse width modulated voltage; and a cable connecting the linear actuator to the driver circuit in the control box. In this way, the actuator system benefits from the described advantages of the linear actuator. The actuator system may further comprise a remote control connected to the driver circuit.

BRIEF DESCRIPTION OF THE DRAWINGS

Embodiments of the invention will now be described more fully below with reference to the drawings, in which.

DETAILED DESCRIPTION

Figure 1:
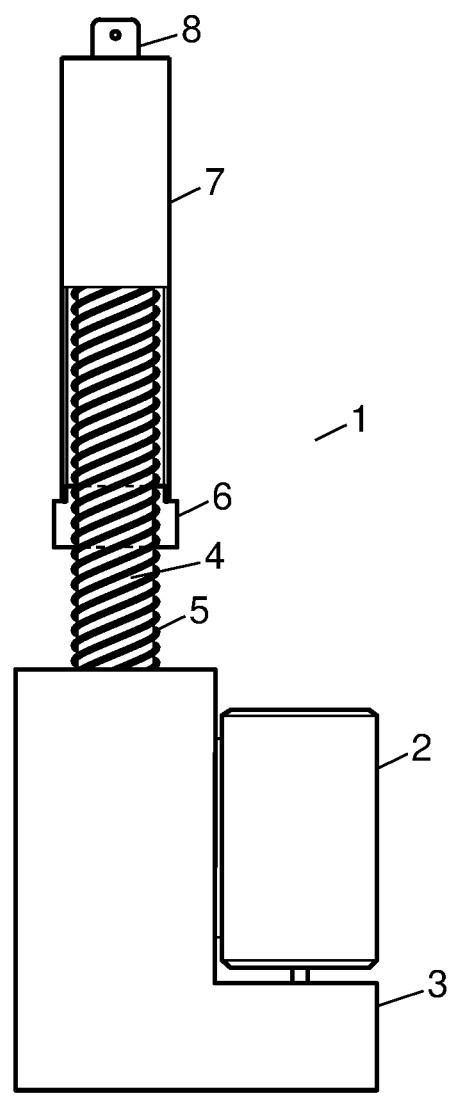
FIG. 1 shows schematically an example of a linear actuator.

FIG. 1 schematically shows an example of a linear actuator 1. The linear actuator 1 comprises a reversible electric motor 2, a transmission or reduction gear 3, typically with several stages, a spindle 4 having a thread 5, a spindle nut 6 engaging the thread 5 and a tube-shaped activation element 7. At the end of the activation element 7, a mounting bracket 8 for mounting the linear actuator 1 to e.g. a carrying element is placed. The spindle nut 6 is secured against rotation. In some linear actuators, the spindle nut is connected directly to e.g. a carrying element without the use of an activation element. When the spindle 4 is rotated by the motor 2, the spindle nut 6 moves along the spindle 4, thus transforming the rotation to a linear movement of the spindle nut 6 and/or the activation element 7 between two end positions. It is noted that with some motor types, the reversible electric motor 2 can drive the spindle 4 directly, so that the transmission 3 can be avoided. Although other types of electric motors may be used, the reversible electric motor 2 is typically a reversible electric DC motor.

Figure 2:
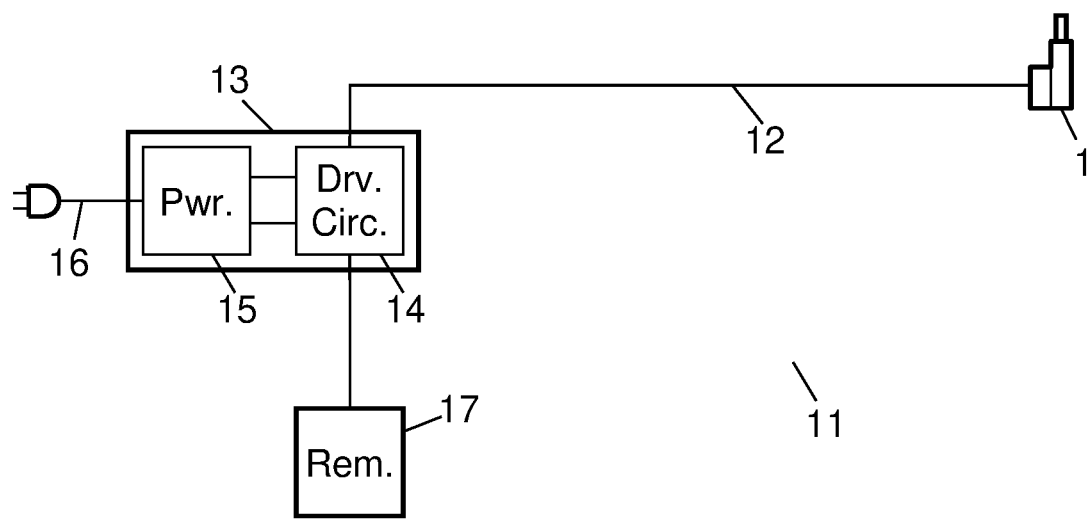
FIG. 2 shows an example of an actuator system, where a linear actuator is used.

An example of an actuator system 11, where a linear actuator 1 is used, is illustrated in FIG. 2. Via a cable 12 the linear actuator 1 is connected to a control box 13 that comprises at least a driver circuit 14 and a power supply 15. The control box 13 is normally placed on the equipment on which the linear actuator 1 is used. This equipment can represent any one of several different applications, such as trucks, agricultural machinery, industrial automation equipment, hospital and care beds, leisure beds and chairs, tables or other articles of furniture with adjustable height and several other similar applications. The power supply 15 is typically connected to a mains AC supply net with a power cable 16, but a battery may also be used, either alone or in combination with a supply connected to a mains net. Finally, the driver circuit 14 is connected to a remote control 17 allowing the operation of the linear actuator 1 to be controlled by a person in the vicinity of the actuator 1. The connection between the remote control 17 and the driver circuit 14 may be a wired connection as shown in FIG. 2, but a wireless communications system, such as a radio link or an infrared link, may also be used. The cable 12 between the driver circuit 14 and the linear actuator 1 may have a length of up to two meters or more, and typically, an unshielded cable type is used for economic reasons.

Figure 3:
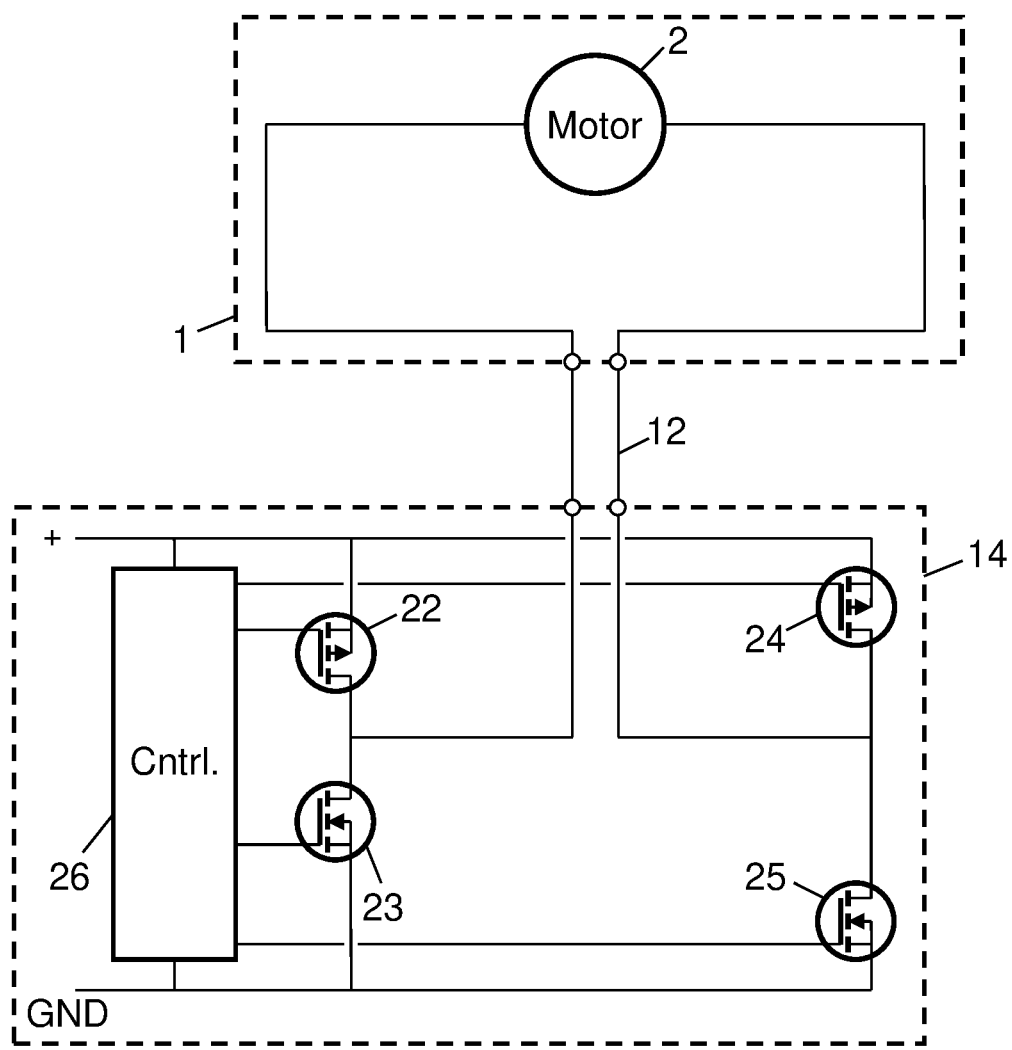
FIG. 3 shows an electric diagram of a linear actuator connected via a cable to a driver circuit.

The driver circuit 14 driving the reversible electric DC motor 2 is typically an H bridge driver circuit comprising four electronic switches 22, 23, 24 and 25 as illustrated in FIG. 3. The driver circuit 14 allows each motor terminal to be connected either to a positive supply voltage or to a ground terminal (or negative supply voltage), so that the motor 2 rotates in one direction when electronic switches 22 and 25 are closed, and in the other direction when electronic switches 23 and 24 are closed. The switches 22, 23, 24 and 25 may be any type of electronically controlled switches, such as field effect transistors (FETs), insulated-gate bipolar transistors (IGBTs) or bipolar transistors, and they are switched on and off by a controller 26, as it will be described in further detail below. In FIG. 3, the electronic switches are shown as FETs.

The motor speed can be controlled by adjusting the DC voltage level supplied to the driver circuit 14, or pulse width modulation (PWM) can be used, where the motor speed is instead controlled by adjusting the duty cycle of the pulse width modulation. As described below, the present application relates to situations where pulse width modulation is used.

As mentioned above, the spindle nut 6 and/or the activation element 7 can be moved between two end positions. It is desirable to determine when an end position has been reached in order to disconnect the drive current, since an undesired tightening of the spindle nut might occur otherwise, which would require a large force to undo, and furthermore a large increase in the drive current would take place and overload of the drive mechanism in general.

The fully extended positions of the spindle nut 6 can be determined in various ways. Typically, the spindle nut 6 or the activation element 7 activates an end stop switch when an end position has been reached, which determines the inner or outer position of the spindle nut 6. The end stop switch may either provide a signal to the driver circuit 14 indicating that the motor current should be interrupted, or it may function directly as a circuit breaker for the motor current. An example of the latter situation is shown in FIG. 4.

Figure 4:
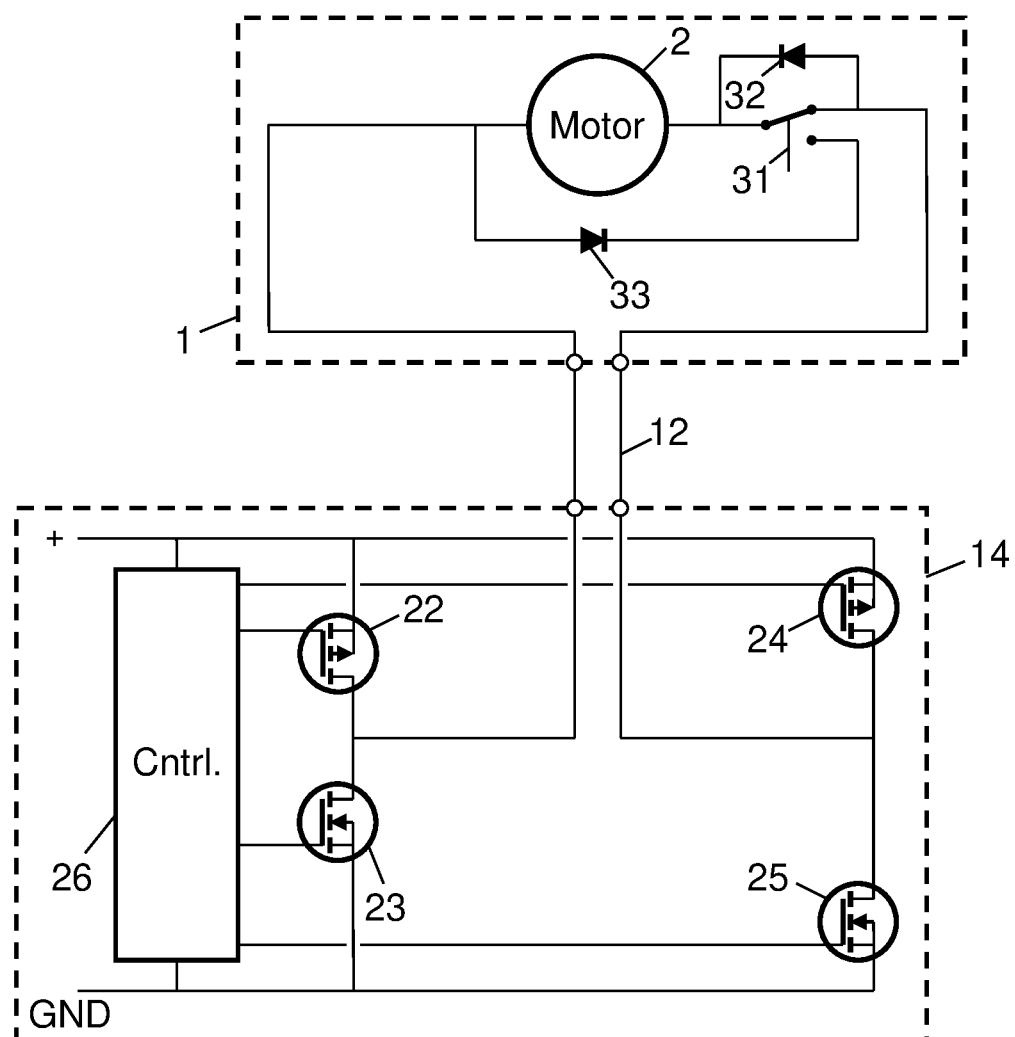
FIG. 4 shows the linear actuator of FIG. 3 provided with an end stop switch, a short circuiting diode and a restart diode for driving the actuator out of an end position.

In FIG. 4, an end stop switch 31 in the linear actuator 1 is connected in series with the motor 2. When the spindle nut 6 reaches the end position corresponding to the end stop switch 31 (as described below, a similar end stop switch may be arranged in relation to the other end position), the switch is activated and the motor current is interrupted. In FIG. 4, it is supposed that the motor current, when it was interrupted, was running from left to right in the figure. To be able to drive the spindle nut 6 out of the end position again, a "restart" diode 32 is connected in parallel to the end stop switch 31 in a direction allowing the driver circuit 14 to drive the motor with a current in the opposite direction of the one that was interrupted by the end stop switch 31. To ensure that the motor 2 stops as fast as possible when the motor current is interrupted by the end stop switch 31, a "short circuit" diode 33 is at the same time connected across the motor 2, so that the current generated by the back electromotive force (back EMF) generated by the motor 2 can be short circuited. Thus in this situation, the end stop switch 31 is not just a circuit breaker, but switches between a first state where the motor 2 is connected to the driver circuit 14 and a second state where the motor 2 is connected to the "short circuit" diode 33. In FIG. 4, the same contact element is used for interrupting the motor current as well as for connecting the "short circuit" diode 33 across the motor 2. However, it is noted that the end stop switch 31 may also comprise a plurality of contact elements, where one contact element is used for interrupting the motor current while another contact element is used for connecting the "short circuit" diode 33 across the motor 2.

Figure 5:
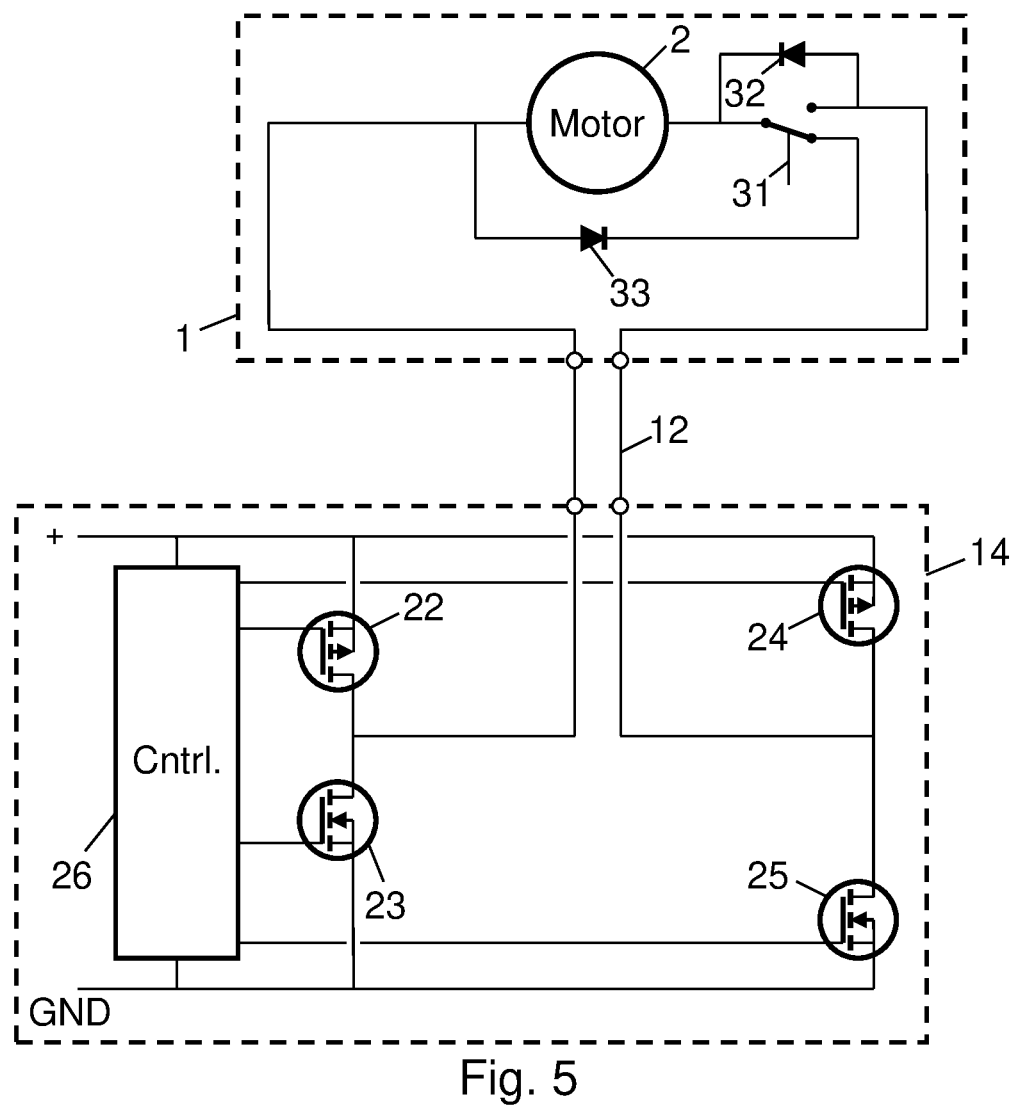
FIG. 5 shows the linear actuator of FIG. 4 with the end stop switch shown in its activated state.

FIG. 5 shows the situation after the motor 2 has been stopped in the end position. FIG. 5 is similar to FIG. 4, except that the end stop switch 31 is in its activated state, where the motor current is interrupted and the "short circuit" diode 33 is instead connected across the motor 2.

To start the motor 2 again, the FETs 24 and 23 are switched on (closed), so that a current can run from the positive voltage through the FET 24, the "restart" diode 32, the motor 2 and the FET 23 to ground. If the motor 2 is driven by a normal DC voltage level, this will work fine, except that a high start current may cause trouble for the power supply. However, if the motor 2 is driven by a pulse width modulated voltage, a noise problem tends to occur, which will be described in the following.

Figure 6:
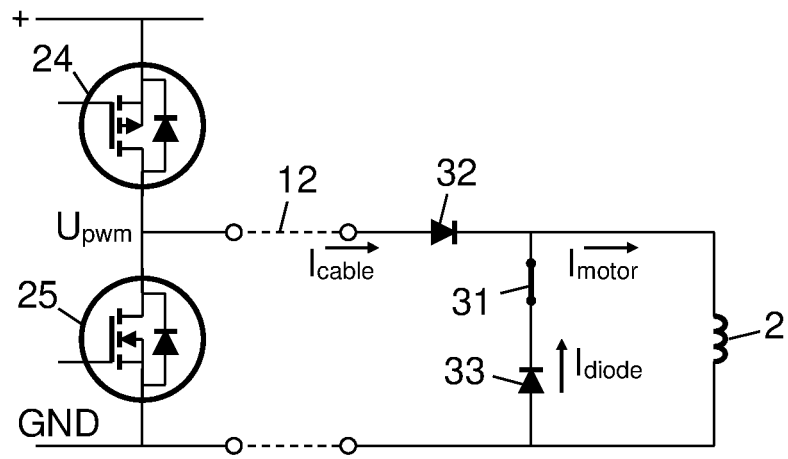
FIG. 6 shows an electric diagram illustrating the situation when the motor is driven out of the end position by a pulse width modulated voltage.
Figure 7:
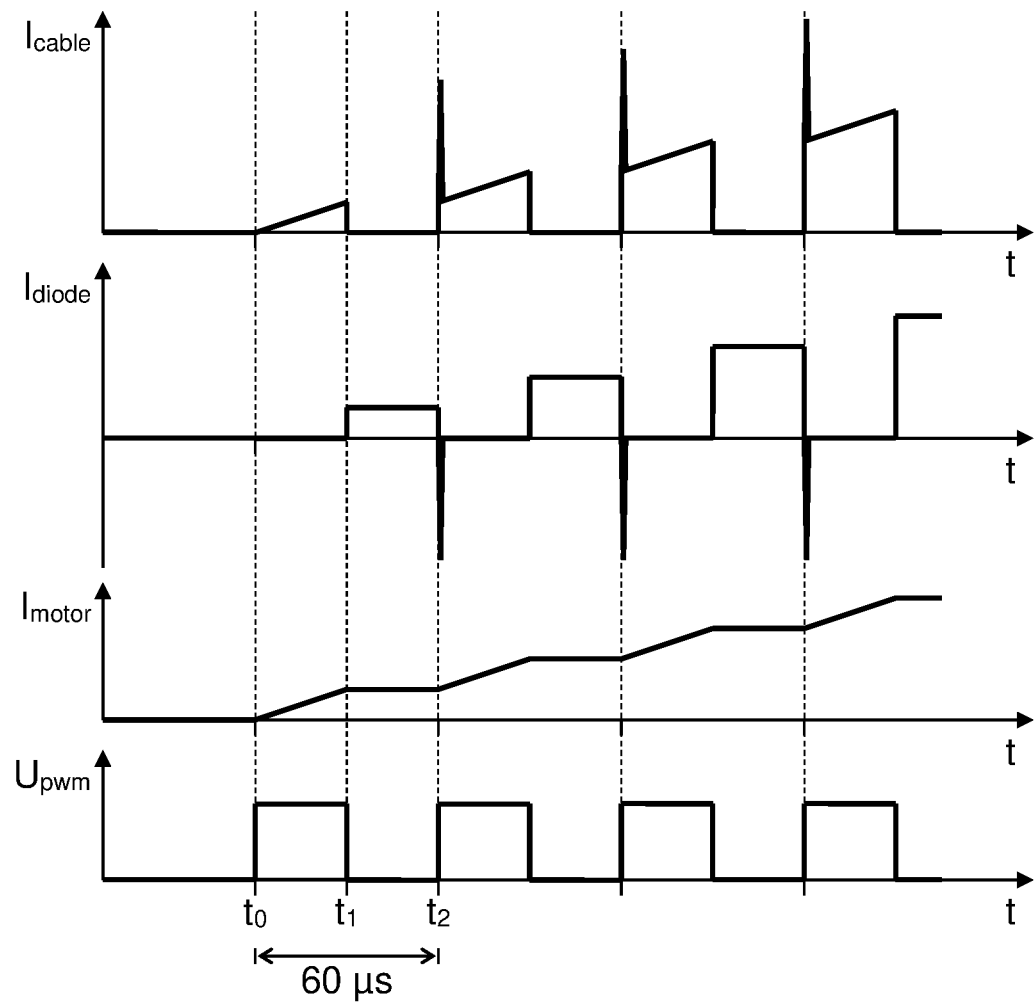
FIG. 7 shows the waveforms of an applied pulse width modulated voltage and corresponding currents in the circuit of FIG. 6 during restart of the motor, where a field effect transistor connected to ground in the driver circuit is kept off during pulse pauses.

FIG. 6 shows an electric diagram illustrating the situation when the motor 2 is driven out of the end position. Because of its inductive character, the motor 2 is here illustrated as an inductance. Since the FET 23 will always be switched on in this situation, it is not shown in the figure; it is just a part of the return path to ground. FETs 24 and 25 are here shown with their built-in so-called body diode that is integrated in a FET. FIG. 7 illustrates the waveforms of the applied pulse width modulated voltage $U_{pwm}$ and the corresponding currents in the circuit during restart of the motor. The pulse width modulated voltage $U_{pwm}$ is shown with a period T of 60 µs corresponding to a modulation frequency of 16⅔ kHz.

At time $t_0$, the first voltage pulse is applied by switching FET 24 on, and a current $I_{motor}$ starts to build up through the cable 12, the "restart" diode 32 and the inductor (motor) 2. Thus, since the current during the pulse is supplied to the motor through the cable 12, the motor current $I_{motor}$ equals the current $I_{cable}$ in the cable 12. At time $t_1$, i.e. at the end of the first pulse, FET 24 is switched off and the supply current is interrupted. However, due to the inductive character of the motor 2, the motor current $I_{motor}$ will be maintained at the same level during the pulse pause. This maintained motor current may circulate either in an inner (seen from the motor 2) loop through the "short circuit" diode 33 as $I_{diode}$ or in an outer loop through the FET 25 (or its body diode if the FET is off) and the "restart" diode 32 as $I_{cable}$, or a combination of the two loops.

If the FET 25 is off, the current will mainly circulate as $I_{diode}$ in the inner loop having only one diode voltage drop compared to two diode voltage drops in the outer loop. This is the situation shown in FIG. 7.

If the FET 25 is kept on during the pulse pause, which will often be the case, the current may be more equally divided between the inner loop $I_{diode}$ and the outer loop $I_{cable}$, because there is only one diode voltage drop in each loop, but since there will always be a certain resistance and inductance in the cable 12, the current tend to prefer the inner loop through the "short circuit" diode 33. In any case, the FET 25 needs to be switched off a short time (e.g. 0.5-1 µs) before FET 24 is switched on again at the start of the next pulse at time $t_2$. This means that at least during this short time just before $t_2$, the motor current will circulate in the inner loop as $I_{diode}$ through the "short circuit" diode 33, which will thus be conducting, as there will be two diode voltage drops in the outer loop. This is illustrated in FIG. 8.

When the FET 24 is switched on again at the start of the next pulse at time $t_2$, the motor current $I_{motor}$ will again be delivered by this FET through the "restart" diode 32 and will again increase as it did during the first pulse. This means that the current will stop circulating as $I_{diode}$ through the "short circuit" diode 33. However, this diode has a certain reverse recovery time, where the charge accumulated in the diode while it was conducting in the forward direction has to be removed (depleted) before it attains its blocking capability. During this reverse recovery time, the diode will actually conduct in the reverse direction and more or less represent a short circuit of the circuit. The result is a short but high current spike from the FET 24 through the cable 12, the "restart" diode 32 and the "short circuit" diode 33. This is illustrated with the spikes in $I_{cable}$ as well as $I_{diode}$ in FIGS. 7 and 8. The magnitude of this current spike is determined by the series impedance of the circuit, e.g. the cable 12, and its duration is determined by the charge accumulated in the diode, which again depends on the level of the current circulating in the diode just before $t_2$.

This phenomenon will be repeated at the start of each of the following pulses, until the spindle nut 6 has been driven out of the end position again and the end stop switch 31 disconnects the "short circuit" diode 33 and instead connects the motor 2 directly to the pulse modulated voltage supplied by the driver circuit 14. Typically, this takes about a few hundred milliseconds.

Figure 8:
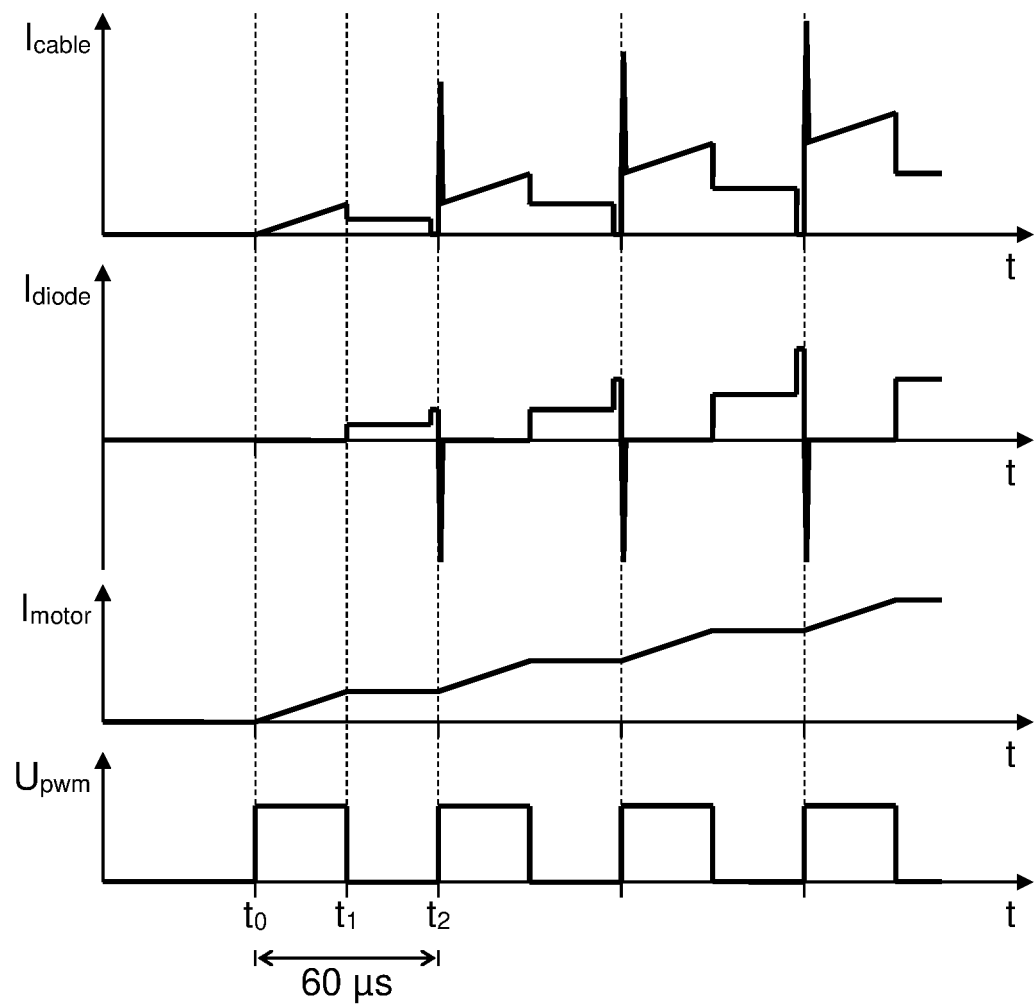
FIG. 8 shows waveforms similar to those of FIG. 7, however in the situation where the field effect transistor connected to ground in the driver circuit is kept on during pulse pauses.

It is noted that in FIGS. 7 and 8, the pulse width modulated voltage $U_{pwm}$ is shown with a duty cycle of 50% as an example. However, similar waveforms can of course be drawn for other values of the duty cycle.

The occurrence of this current spike, which may be considerably higher than the motor current, means that in addition to the motor current, the driver circuit 14 must be able to deliver this current spike. More importantly, since the cable 12 is typically an unshielded cable, the current spike in the cable will cause noise radiation from the cable, which may cause problems with the electromagnetic compatibility (EMC) of the system. Further, as mentioned above, there will always be a certain inductance in the cable 12, and during the current spike, an amount of energy will therefore be accumulated in the cable. The accumulated energy can be calculated as ½ L i², where L is the inductance of the cable and i is the current. After the spike, this energy has to be released, and since the "short circuit" diode 33, which has now entered its blocking state, presents a certain capacitance, a resonance circuit is formed by this capacitance and the inductance of the cable 12, and resonance oscillations or ringing will therefore occur. The amplitudes of these oscillations may be quite considerable, and since the capacitance of the diode 33 is non-linear, they will not have a single oscillation frequency, but instead they will occur within a broader frequency spectrum. Also these oscillations may give rise to noise radiation from the cable 12.

In FIGS. 4 and 5 described above, an end stop switch 31 is arranged in relation to one of the end positions of the spindle nut 6. However, as mentioned above, a similar end stop switch may be arranged in relation to the other end position. This is illustrated in FIG. 9, where the end stop switch 31 is activated when the spindle nut 6 reaches one of its end positions and the end stop switch 34 is activated when it reaches the other end position.

Also the end stop switch 34 has a "restart" diode 35 connected in parallel in a direction allowing the driver circuit 14 to drive the motor with a current in the opposite direction of the one that was interrupted by the end stop switch 34 to be able to drive the spindle nut 6 out of the end position again. Similarly, a "short circuit" diode 36 is connected across the motor 2, so that the current generated by the back electromotive force (back EMF) generated by the motor 2 can be short circuited. This ensures that the motor 2 stops as fast as possible when the end stop switch 34 interrupts the motor current. The function of the end stop switch 34 and the diodes 35 and 36, including the problems in relation to generation of noise spikes, is exactly the same as described for the end stop switch 31 and the diodes 32 and 33.

The "short circuit" diodes 33 and 36 may also be arranged slightly differently in the circuit without changing their function. Two examples of this are shown in FIGS. 10 and 11.

Figure 9:
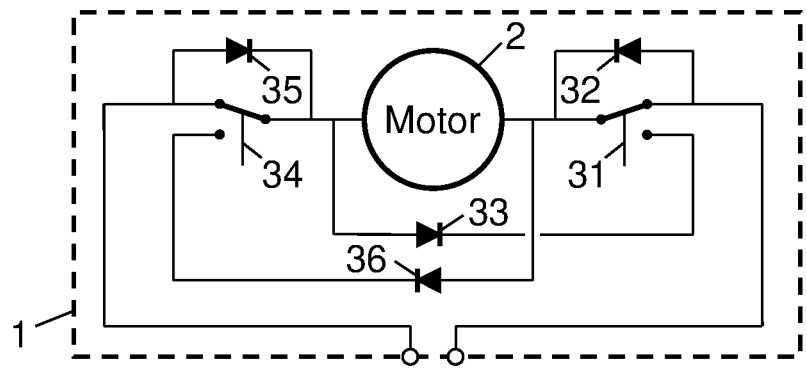
FIGS. 9 to 11 show different arrangements of end stop switches physically placed in both end positions.
Figure 10:
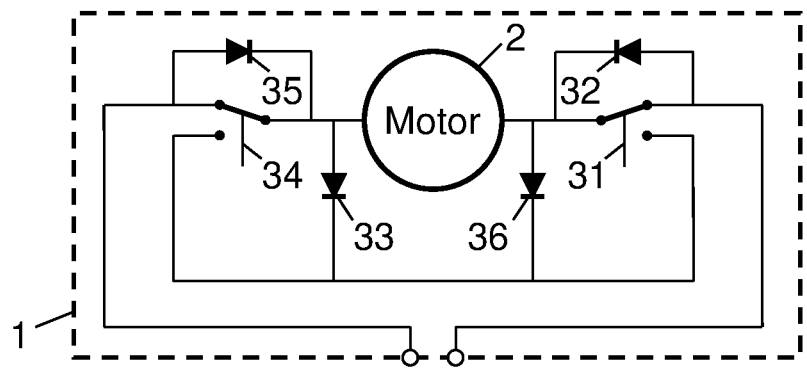
Figure 11:
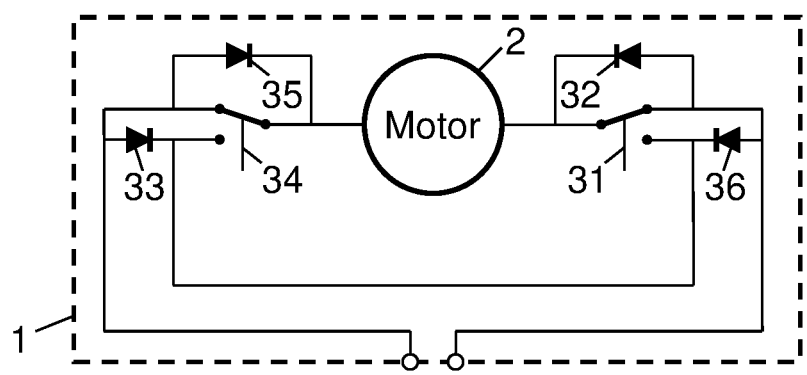
Figure 12:
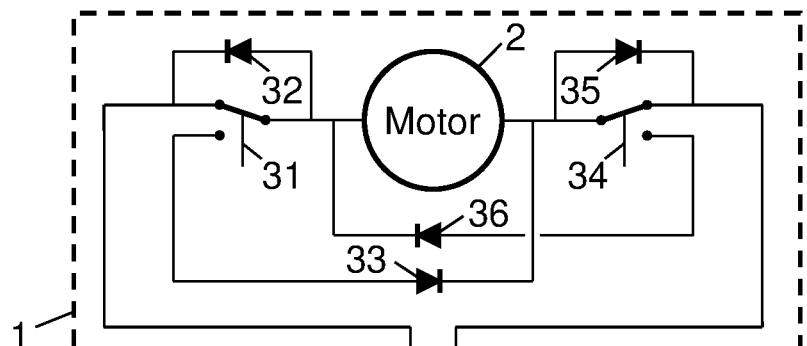
FIG. 12 shows the arrangement of FIG. 9 with the position of the two end stop switches interchanged.

Further, in FIGS. 9, 10 and 11, the position of the two end stop switches 31 and 34 in the diagram may also be interchanged, so that a motor current running into the motor 2 is interrupted when the switch is activated instead of a motor current running out of the motor 2. In that case, also the direction of the four diodes 32, 33, 35 and 36 has to be changed. An example of this is shown in FIG. 12, which corresponds to FIG. 9, just with the position of the two end stop switches interchanged. Similar modifications can be made for the circuits of FIGS. 10 and 11.

Figure 13:
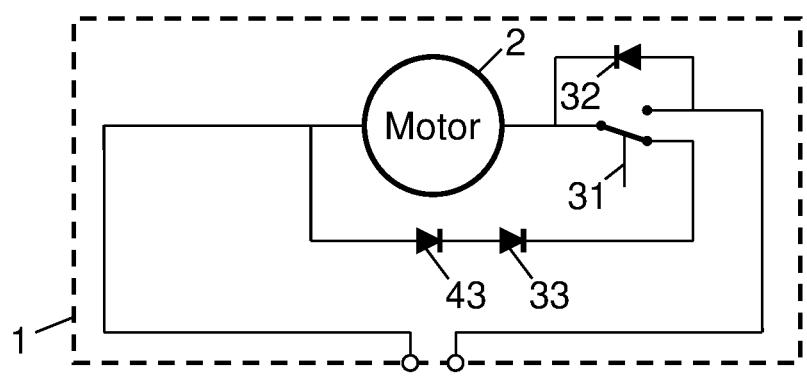
FIG. 13 shows the linear actuator of FIGS. 4 and 5 with an additional diode arranged in series with the short circuiting diode.
Figure 14:
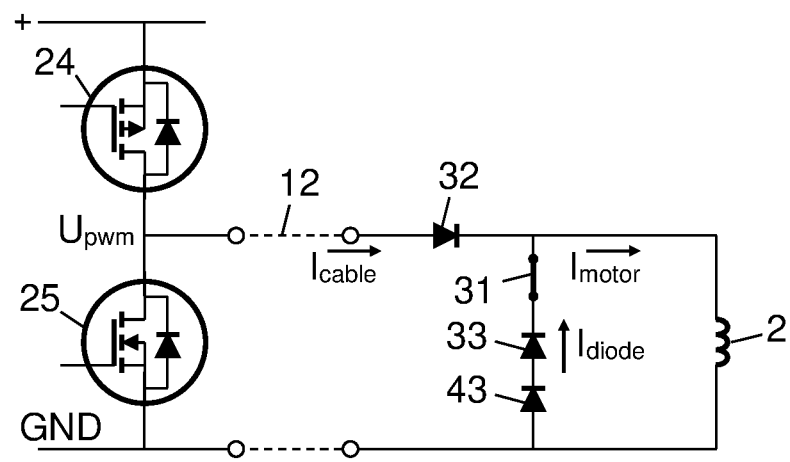
FIG. 14 shows an electric diagram illustrating the situation when the motor of the linear actuator of FIG. 13 is driven out of the end position by a pulse width modulated voltage.
Figure 15:
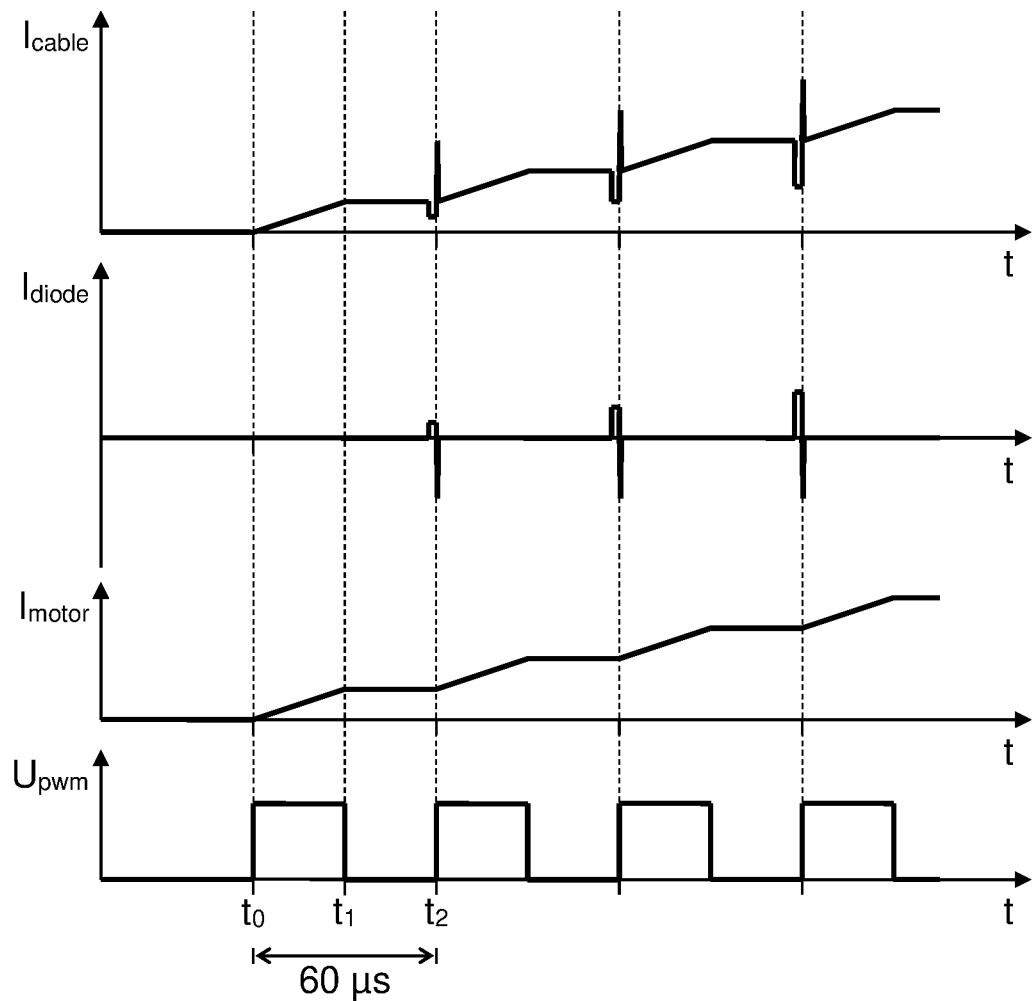
FIG. 15 shows the waveforms of an applied pulse width modulated voltage and corresponding currents in the circuit of FIG. 14 during restart of the motor.

FIG. 13 shows an example of a circuit modification that reduces the noise problems originating from the current spike described above. FIG. 13 corresponds to the actuator 1 of FIG. 4, but an additional component, here in the form of an additional diode 43 is now arranged in series with the "short circuit" diode 33. In FIG. 13, the cathode of the additional diode 43 is connected to the anode of the "short circuit" diode 33, but the additional diode 43 can just as well be arranged at the other side of the "short circuit" diode 33, so that its anode is connected to the cathode of the "short circuit" diode 33. Similarly to FIG. 6, FIG. 14 shows a simplified electric diagram illustrating the situation when the motor 2 of FIG. 13 is driven out of the end position. The corresponding waveforms of the applied pulse width modulated voltage $U_{pwm}$ and the currents in the modified circuit during restart of the motor are illustrated in FIG. 15. FIG. 15 shows the waveforms in the situation where the FET 25 in the driver circuit 14 is kept on during the pulse pause, i.e. corresponding to the waveforms of FIG. 8.

At time $t_1$, when FET 24 is switched off and the supply current is interrupted, the maintained motor current $I_{motor}$ will now mainly circulate in the outer loop through the FET 25 and the "restart" diode 32 as $I_{cable}$, because now this loop has only one diode voltage drop compared to two diode voltage drops in the inner loop. However, again the FET 25 needs to be switched off a short time (e.g. 0.5-1 µs) before FET 24 is switched on again at the start of the next pulse at time $t_2$. This means that during this short time just before $t_2$, the motor current will be more equally divided between the inner loop $I_{diode}$ and the outer loop $I_{cable}$, because now there are two diode voltage drops in each loop. Thus, the "short circuit" diode 33 and the additional diode 43 will only be conducting during this short time just before $t_2$, and the current level will be considerably reduced compared to the situation in FIG. 8. This means that also the charge accumulated in the "short circuit" diode 33 while it is conducting in the forward direction will be correspondingly reduced.

When the FET 24 is switched on again at the start of the next pulse at time $t_2$ and the motor current $I_{motor}$ is again delivered by this FET through the "restart" diode 32, the reverse recovery time of the "short circuit" diode 33 will now be considerably shorter compared to FIG. 8 due to the reduced charge accumulated in the diode. This means that the current spike occurring in the cable 12, the "restart" diode 32 and the "short circuit" diode 33 will also be considerably shorter, and the energy in the spike thus considerably reduced. Due to the inductance of the cable 12, the magnitude of the spike will typically also be lower. This is illustrated with the shorter spikes in $I_{cable}$ as well as $I_{diode}$ in FIG. 15. The reduced energy in the spikes also reduces the noise radiated from the cable 12 and the other consequences mentioned above.

Figure 16:
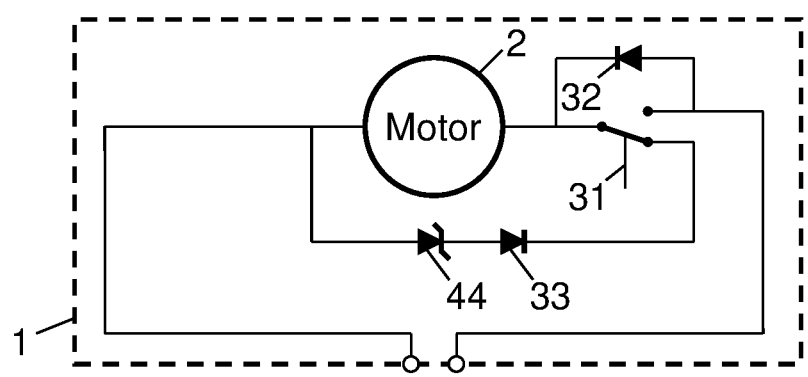
FIG. 16 shows the linear actuator of FIGS. 4 and 5 with a Zener diode arranged in series with the short circuiting diode.
Figure 17:
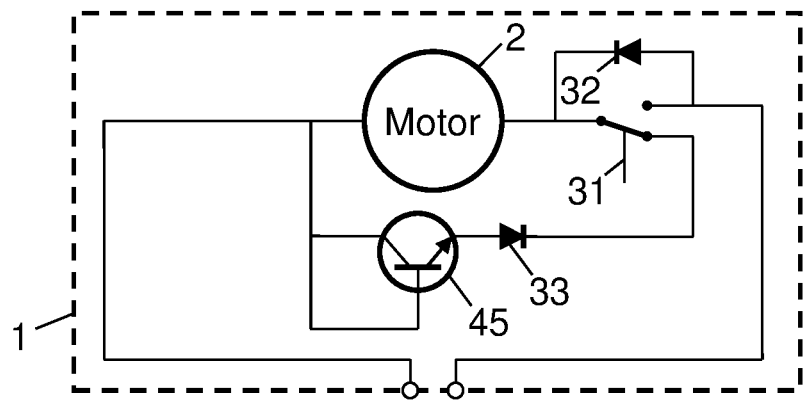
FIG. 17 shows the linear actuator of FIGS. 4 and 5 with a bipolar transistor arranged in series with the short circuiting diode.
Figure 18:
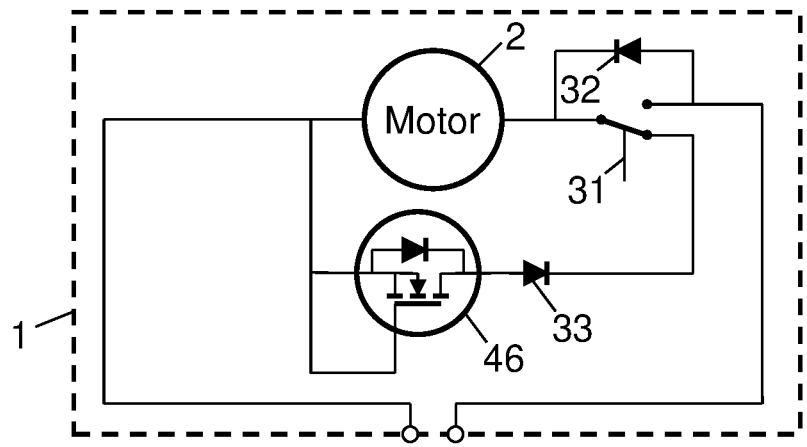
FIG. 18 shows the linear actuator of FIGS. 4 and 5 with a field effect transistor arranged in series with the short circuiting diode.

The additional diode 43 in FIG. 13 may also be implemented or replaced by other component types. A few examples of this are mentioned in the following. In FIG. 16, a Zener diode 44 is used as the additional component. Since the Zener diode 44 is connected in series with the "short circuit" diode 33, which will prevent currents in the blocking direction, the Zener diode 44 is used as a diode instead of a Zener diode, and the Zener voltage of the Zener diode 44 is thus of less importance. In FIG. 17, a bipolar transistor 45 is used as the additional component. The base and collector terminals of the transistor are connected together so that the base-emitter diode makes the transistor work as a diode. In FIG. 18, a field effect transistor 46, e.g. a MOSFET, is used as the additional component. In this case, the gate and source terminals are connected together so that the field effect transistor will always be off. However, the built-in body diode that is integrated in the FET will fulfil the same function as the additional diode 43 in FIG. 13.

Figure 19:
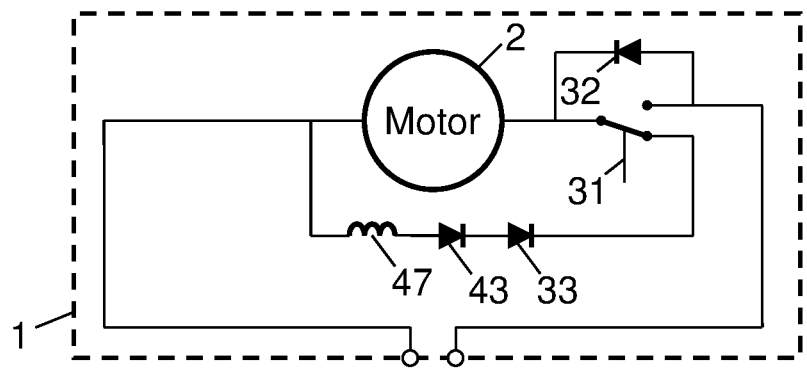
FIG. 19 shows the linear actuator of FIGS. 4 and 5 with an additional diode and an inductor arranged in series with the short circuiting diode.
Figure 20:
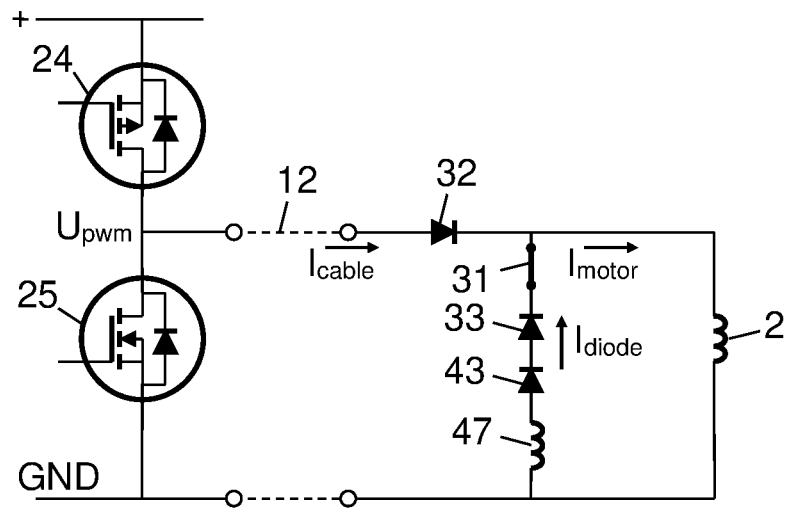
FIG. 20 shows an electric diagram illustrating the situation when the motor of the linear actuator of FIG. 19 is driven out of the end position by a pulse width modulated voltage.
Figure 21:
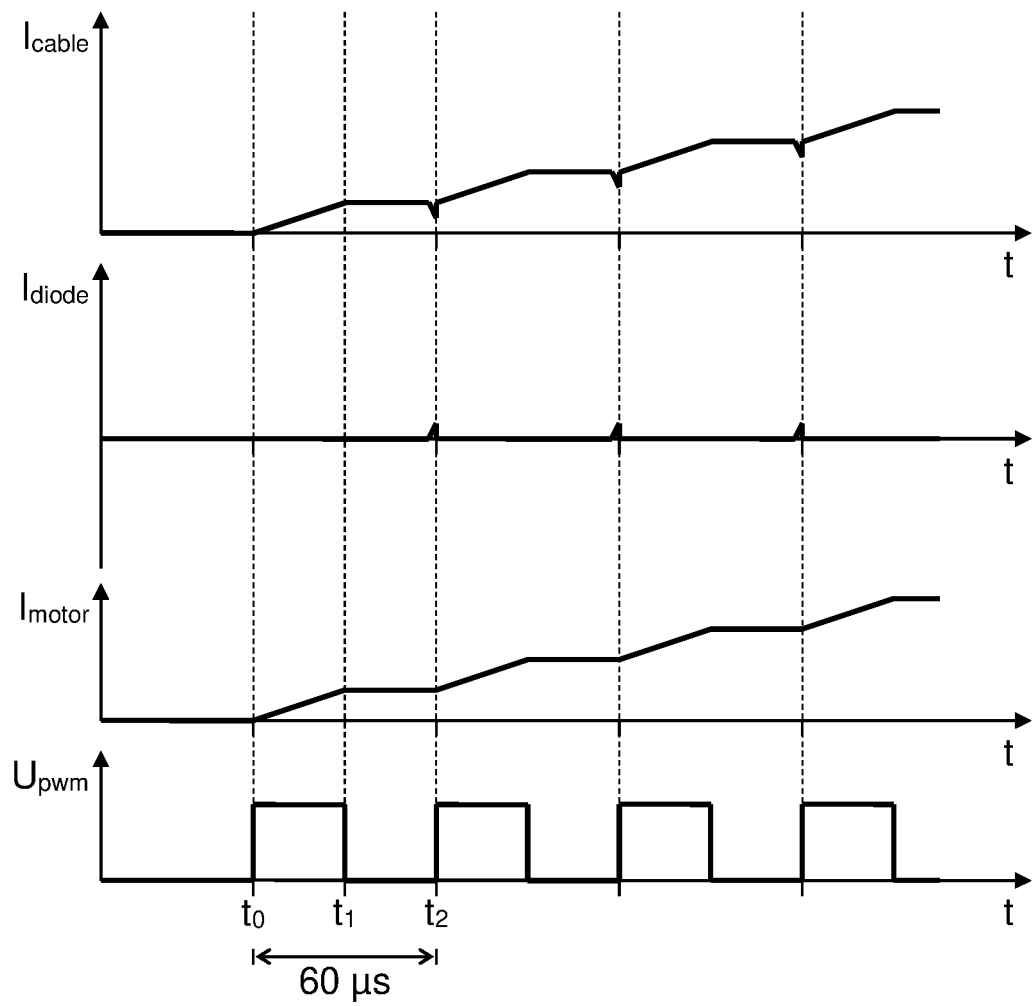
FIG. 21 shows the waveforms of an applied pulse width modulated voltage and corresponding currents in the circuit of FIG. 20 during restart of the motor.

The circuit of FIG. 13 may be further improved by also arranging an inductor 47 in series with the "short circuit" diode 33 and the additional diode 43 as shown in FIG. 19. FIG. 20 shows the corresponding simplified electric diagram illustrating the situation when the motor 2 is driven out of the end position. The corresponding waveforms of the applied pulse width modulated voltage $U_{pwm}$ and the currents in the modified circuit during restart of the motor are illustrated in FIG. 21.

Until the FET 25 is switched off a short time before FET 24 is switched on again at the start of the next pulse at time $t_2$, the waveforms are the same as those shown in FIG. 15 for the circuit of FIGS. 13 and 14 with the motor current mainly circulating in the outer loop through the FET 25 and the "restart" diode 32 as $I_{cable}$, because this loop has only one diode voltage drop compared to two diode voltage drops in the inner loop. During the short time just before $t_2$, the motor current will still tend to be more equally divided between the inner loop $I_{diode}$ and the outer loop $I_{cable}$, because now there are two diode voltage drops in each loop. However, as illustrated in FIG. 21, the current $I_{diode}$ in the inner loop can now only increase with a certain dI/dt determined by the formula V=L dI/dt, where L is the self-inductance of the inductor 47 and V is the voltage over the inductor. Consequently, the current $I_{cable}$ in the outer loop decreases correspondingly. This means that the charge accumulated in the "short circuit" diode 33 while it is conducting in the forward direction will be further reduced compared to the situation in FIG. 15.

When the FET 24 is switched on again at the start of the next pulse at time $t_2$ and the motor current $I_{motor}$ is again delivered by this FET through the "restart" diode 32, the "short circuit" diode 33 will still be able to conduct in the reverse direction during its reverse recovery time. However, due to the presence of the inductor 47, this current can again only increase with a certain dI/dt determined by the formula mentioned above, and by a suitable choice of the self-inductance L of the inductor 47, it can be ensured that the current spike shown in the previous figures is reduced so that it practically does not occur. This is illustrated in FIG. 21. An example of a suitable value is a self-inductance of 10 µH, but values in the range 1-100 µH can be used. The in practice no longer occurring spikes thus also in practice eliminates the noise radiated from the cable 12 and the other consequences mentioned above. The benefit of the inductor 47 is that the dI/dt of the currents is now determined by the well-defined inductance of the inductor 47 that is designed to dominate over the much smaller and more or less unknown inductance of the cable 12 and the other conductors of the circuit.

It is noted that the inductor 47 can also be used in series with the "short circuit" diode 33 and the other component types shown in FIGS. 16 to 18.

It is also noted that the circuits of FIGS. 13 and 16 to 18 may also be improved by arranging another component type, e.g. one or more further diodes or the other component types shown in FIGS. 16 to 18, in series with the "short circuit" diode 33 and the additional diode 43 (or the other component types shown in FIGS. 16 to 18) instead of the inductor 47.

The circuits shown in FIGS. 13, 14, 16, 17, 18, 19 and 20 and described above have an end stop switch 31 arranged in relation to one of the end positions of the spindle nut 6. However, as mentioned above, a similar end stop switch is typically arranged in relation to the other end position as shown in FIGS. 9, 10, 11 and 12, where the end stop switch 31 is activated when the spindle nut 6 reaches one of its end positions and the end stop switch 34 is activated when it reaches the other end position. The solutions shown in FIGS. 13, 14, 16, 17, 18, 19 and 20 can of course also be implemented in the circuits of FIGS. 9, 10, 11 and 12. As examples, FIGS. 22 to 25 show how the solution of FIG. 19 with an additional diode 43 and an inductor 47 arranged in series with the "short circuit" diode 33 can be implemented in the circuits of FIGS. 9, 10 and 11.

Figure 22:
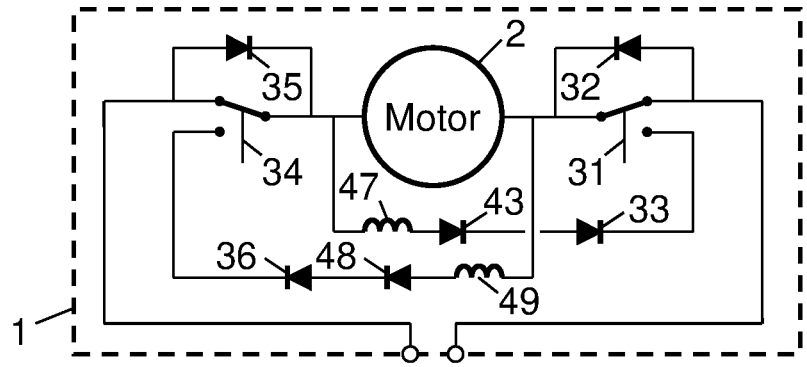
FIGS. 22 to 25 show different arrangements of end stop switches with the circuit of FIG. 19 arranged in both end positions.

Thus, FIG. 22 corresponds to FIG. 9. An additional diode 43 and an inductor 47 are arranged in series with the "short circuit" diode 33, and an additional diode 48 and an inductor 49 are arranged in series with the "short circuit" diode 36. The function of the circuit is the same as described in relation to FIG. 19.

Figure 23:
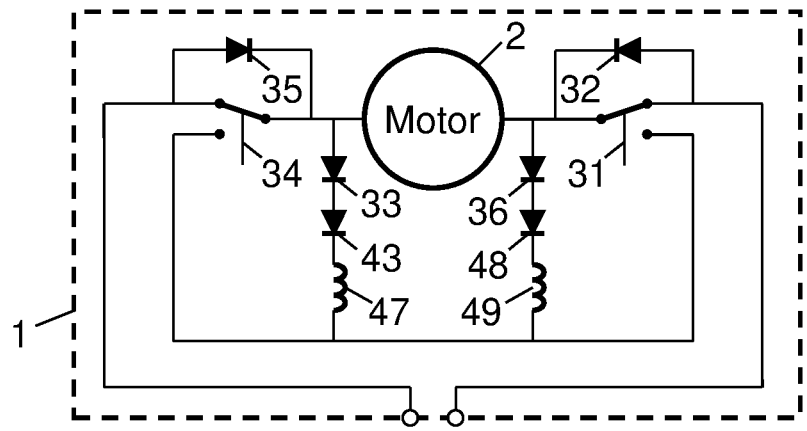
Figure 24:
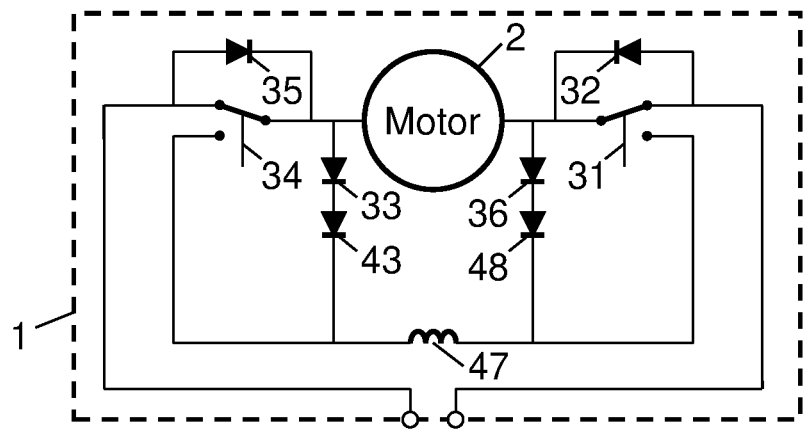

Similarly, FIG. 23 corresponds to FIG. 10. An additional diode 43 and an inductor 47 are arranged in series with the "short circuit" diode 33, and an additional diode 48 and an inductor 49 are arranged in series with the "short circuit" diode 36. The function of the circuit is the same as described in relation to FIG. 19. However, in this case, the circuit can also be implemented as shown in FIG. 24, where only one inductor 47 is used, which is then common for both end positions. When the end stop switch 31 has been activated because the spindle nut 6 is in one of its end positions, the inductor 47 will be in series with the "short circuit" diode 33 and the additional diode 43, and when the end stop switch 34 has been activated because the spindle nut 6 is in the other end position, the inductor 47 will be in series with the "short circuit" diode 36 and the additional diode 48.

Figure 25:
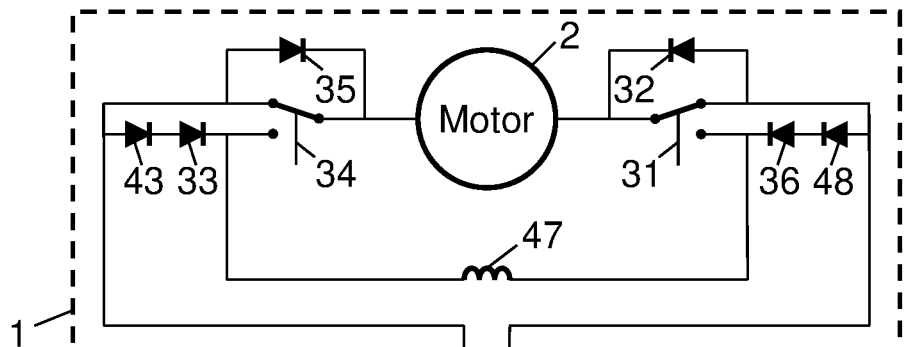

FIG. 25 corresponds to FIG. 11. Also here, a single inductor 47 is used, which is common for both end positions. Again, the function of the circuit is the same as described in relation to FIG. 19.

Figure 26:
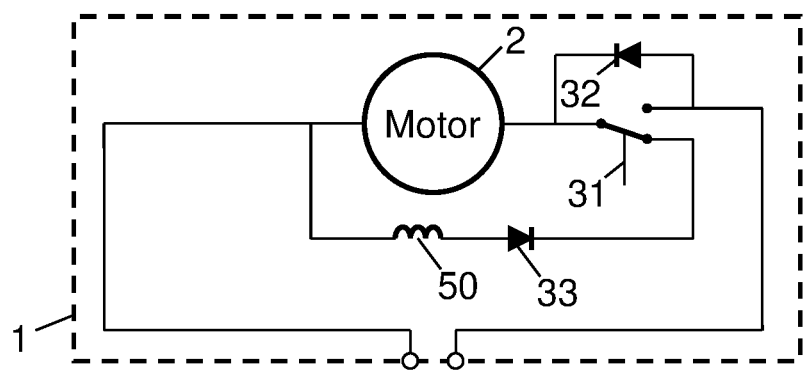
FIG. 26 shows the linear actuator of FIGS. 4 and 5 with an inductor arranged in series with the short circuiting diode.
Figure 27:
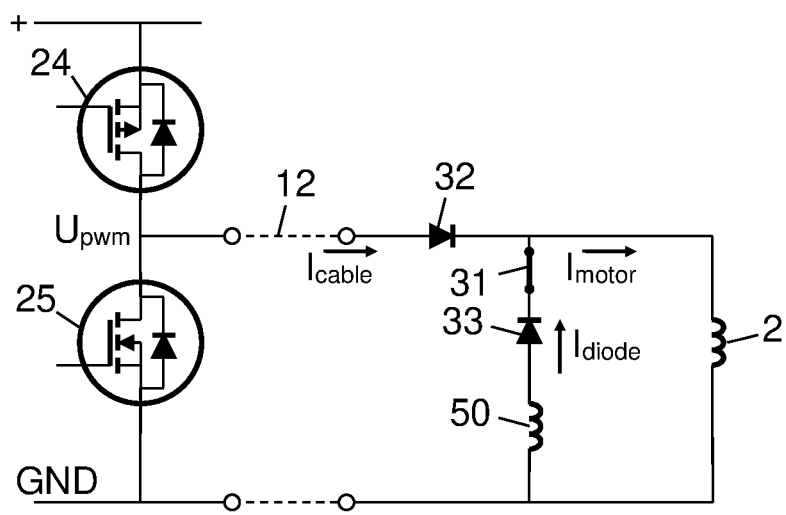
FIG. 27 shows an electric diagram illustrating the situation when the motor of the linear actuator of FIG. 26 is driven out of the end position by a pulse width modulated voltage.
Figure 28:
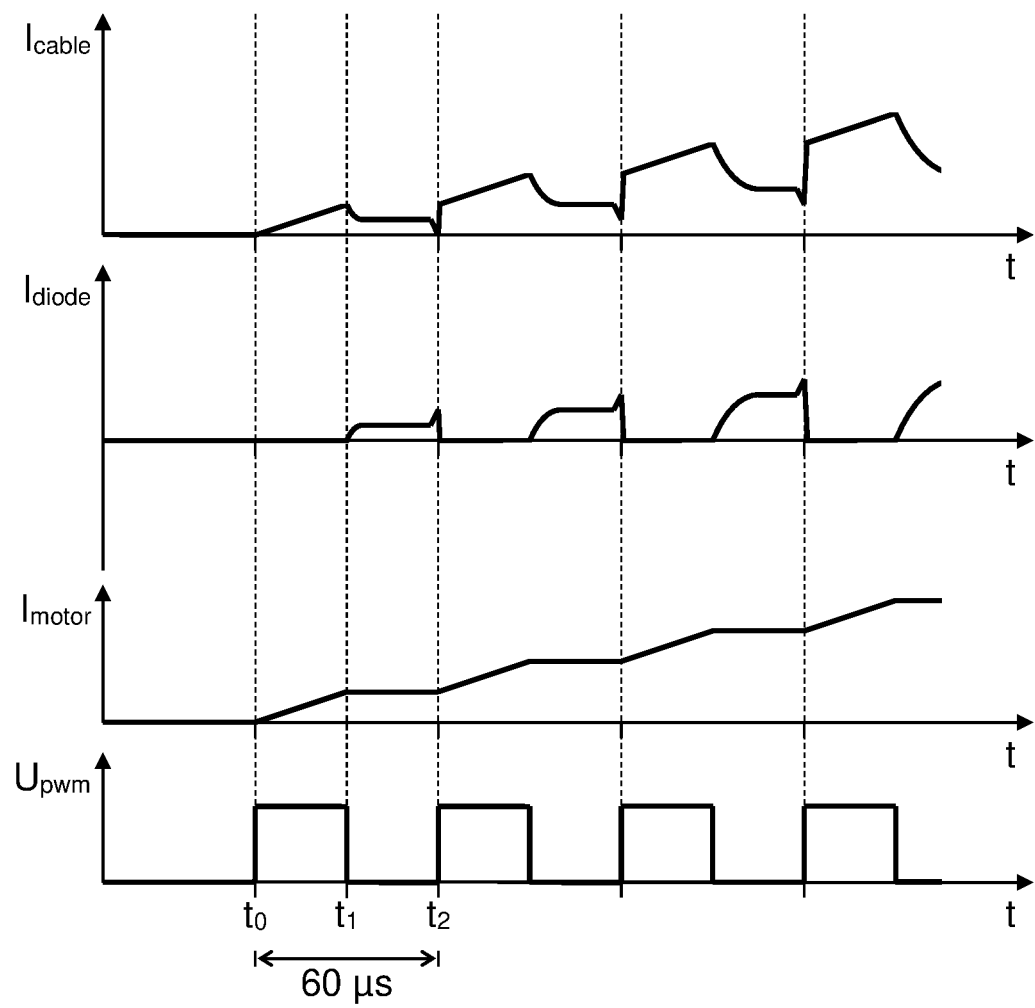
FIG. 28 shows the waveforms of an applied pulse width modulated voltage and corresponding currents in the circuit of FIG. 27 during restart of the motor.

In FIG. 19, the inductor 47 is arranged in series with the "short circuit" diode 33 and the additional diode 43. However, an inductor 50 can also be used as the only additional component in series with the "short circuit" diode 33. This is shown in FIG. 26, and again FIG. 27 shows the corresponding simplified electric diagram illustrating the situation when the motor 2 is driven out of the end position. The corresponding waveforms of the applied pulse width modulated voltage $U_{pwm}$ and the currents in this circuit during restart of the motor are illustrated in FIG. 28.

Compared to FIG. 8, i.e. in the situation where the FET 25 is kept on during the pulse pause, the maintained motor current $I_{motor}$ at time $t_1$ when FET 24 is switched off will also here be divided between the inner loop $I_{diode}$ and the outer loop $I_{cable}$, because there is only one diode voltage drop in each loop. However, as illustrated in FIG. 28, the current $I_{diode}$ in the inner loop will now increase more slowly due to the presence of the inductor 50. The current in the outer loop $I_{cable}$ decreases correspondingly.

During the short time where the FET 25 is switched off just before FET 24 is switched on again at the start of the next pulse at time $t_2$ the current $I_{diode}$ in the inner loop can again only increase with a certain dI/dt. Consequently, the current $I_{cable}$ in the outer loop decreases correspondingly.

When the FET 24 is switched on again at the start of the next pulse at time $t_2$ and the motor current $I_{motor}$ is again delivered by this FET through the "restart" diode 32, the "short circuit" diode 33 will still be able to conduct in the reverse direction during its reverse recovery time. However, due to the presence of the inductor 50, this current can again only increase with a certain dI/dt determined by the formula mentioned above, and by a suitable choice of the self-inductance L of the inductor 50, it can be ensured that the current spike shown in FIG. 8 is reduced so that it practically does not occur. An example of a suitable value is a self-inductance of 10 µH, but values in the range 1-100 µH can be used. This is illustrated in FIG. 28. The in practice no longer occurring spikes thus also in practice eliminates the noise radiated from the cable 12 and the other consequences mentioned above.

A further example of a component that can be used as an additional component in series with the "short circuit" diode 33 for reducing or eliminating the above-mentioned noise problems caused by the reverse recovery time of this diode, is a field effect transistor, e.g. a MOSFET, coupled to be on during the braking period when the end stop switch 31 has interrupted the motor current and off when the motor 2 is driven out of the end stop again with a pulse width modulated voltage. In this way, the "short circuit" diode 33 is allowed to conduct the short circuit current after the interruption as intended, while it is prevented from conducting any current when the motor 2 is started again in the opposite direction. An example of this is illustrated in FIG. 29.

Figure 29:
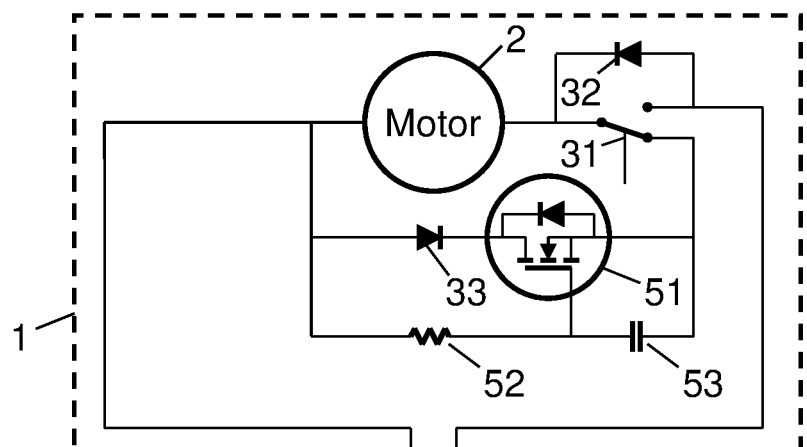
FIG. 29 shows the linear actuator of FIGS. 4 and 5 with a field effect transistor controlled by an RC circuit arranged in series with the short circuiting diode.

In FIG. 29, a MOSFET 51 is coupled in series with the "short circuit" diode 33 with its drain terminal connected to the cathode of the diode and its source terminal connected to the end stop switch 31. The gate terminal of the MOSFET 51 is connected to an RC circuit composed of a resistor 52 connected to the anode of the "short circuit" diode 33 and the motor, and a capacitor 53 connected to the source terminal of the MOSFET 51. As an example, the RC circuit can be designed with a time constant RC of 100 µs, but time constants in the range of 100 µs to 1 ms can be suitable.

Before the motor 2 is interrupted by the end stop switch 31, the circuit consisting of the "short circuit" diode 33, the MOSFET 51, the resistor 52 and the capacitor 53 is disconnected from the rest of the circuit, because the end stop switch is in its upper position.

When the end stop switch is activated, the supply current to the motor 2 is interrupted and instead the circuit with the "short circuit" diode 33 is connected across the motor 2. In this situation, there is no charge on the capacitor 53 and thus no voltage across it, and therefore the MOSFET 51 will be off. However, as soon as the back electromotive force provides a voltage across the motor 2, the capacitor 53 will begin to charge through the resistor 52, and when the capacitor voltage, which is equal to the gate-source voltage of MOSFET 51, exceeds the threshold voltage of the MOSFET, the MOSFET 51 will be switched on. This of course reduces the voltage across the RC circuit, i.e. the voltage to which the capacitor 53 is charged, to the diode voltage drop over the "short circuit" diode 33 plus the voltage drop over the MOSFET 51. If this voltage is not sufficiently higher than the threshold voltage of the MOSFET to keep the MOSFET on, an extra diode can be added in series with the "short circuit" diode 33. When the short circuit current ceases because the motor 2 has stopped rotating, the capacitor 53 will be discharged and the MOSFET 51 will be switched off.

Figure 30:
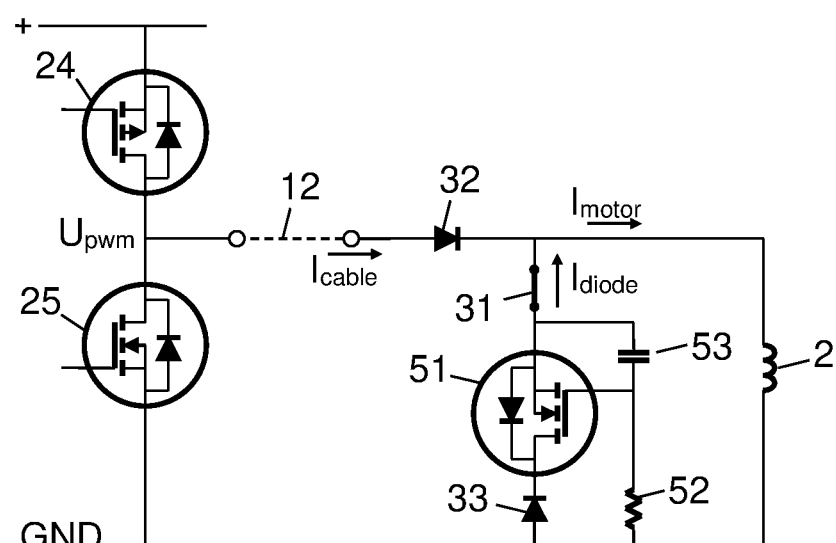
FIG. 30 shows an electric diagram illustrating the situation when the motor of the linear actuator of FIG. 29 is driven out of the end position by a pulse width modulated voltage.
Figure 31:
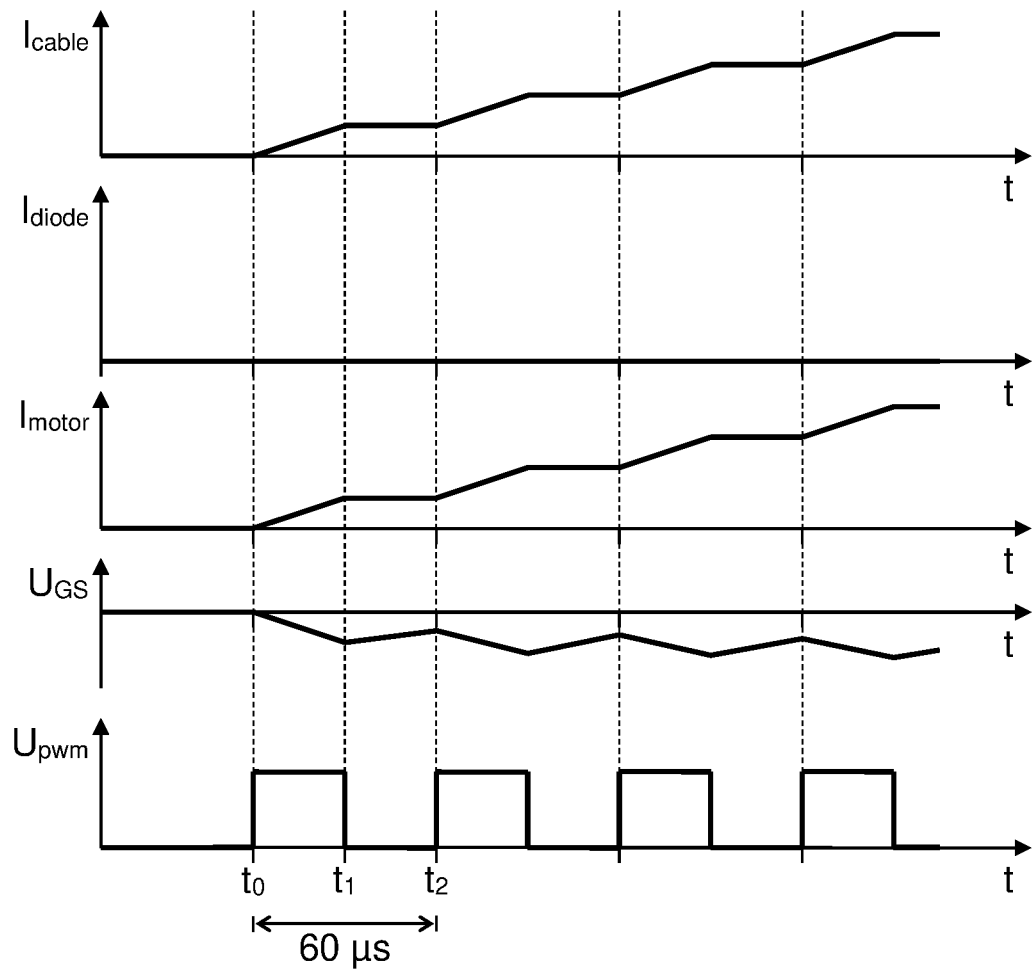
FIG. 31 shows the waveforms of an applied pulse width modulated voltage and corresponding currents in the circuit of FIG. 30 during restart of the motor.

FIG. 30 shows a simplified electric diagram of the circuit illustrating the situation when the motor 2 is driven out of the end position. The corresponding waveforms of the applied pulse width modulated voltage $U_{pwm}$ and the currents in this circuit during restart of the motor are illustrated in FIG. 31, which also shows the gate-source voltage $U_{GS}$ of MOSFET 51, which is equal to the voltage of the capacitor 53. The capacitor voltage is shown for a time constant RC in the range of 100 μs.

At time $t_0$, when the first voltage pulse is applied by switching FET 24 on and the motor current $I_{motor}$ starts to build up, the capacitor 53 will begin to charge through the resistor 52, thus creating a negative gate-source voltage $U_{GS}$ of MOSFET 51. At time $t_1$, when FET 24 is switched off and the supply current is interrupted, the negative gate-source voltage will ensure that the MOSFET 51 is kept in its off state. It is noted that the direction of the built-in body diode of the MOSFET 51 is opposite to the direction of the "short circuit" diode 33, so that no current will run through the body diode. Thus, the maintained motor current $I_{motor}$ will now only circulate in the outer loop through the FET 25 and the "restart" diode 32 as $I_{cable}$, because the MOSFET 51 prevents the "short circuit" diode 33 from conducting any current. During the pulse pause, i.e. from $t_1$ to $t_2$, the capacitor 53 will again discharge, but as it can be seen in FIG. 31, the gate-source voltage $U_{GS}$ of MOSFET 51 will remain negative. It is noted that in FIG. 31, the waveforms are shown for a duty cycle of 50%. The waveforms will of course be slightly different for other duty cycles, but the gate-source voltage $U_{GS}$ of MOSFET 51 will remain negative, or at least below the threshold voltage, even for low values of the duty cycle, so that the MOSFET 51 is kept in its off state and the "short circuit" diode 33 prevented from conducting during the pulse pause.

When the FET 24 is switched on again at the start of the next pulse at time $t_2$ and the motor current $I_{motor}$ is again delivered by this FET through the "restart" diode 32, the "short circuit" diode 33 has not been conducting, and thus there will be no reverse recovery. Further, the MOSFET 51 is still in its off state, so no current spike can occur in the inner loop, i.e. through the "short circuit" diode 33 and the MOSFET 51. Thus with this circuit, the current spike described above has been eliminated and the related noise problems are avoided.

Figure 32:
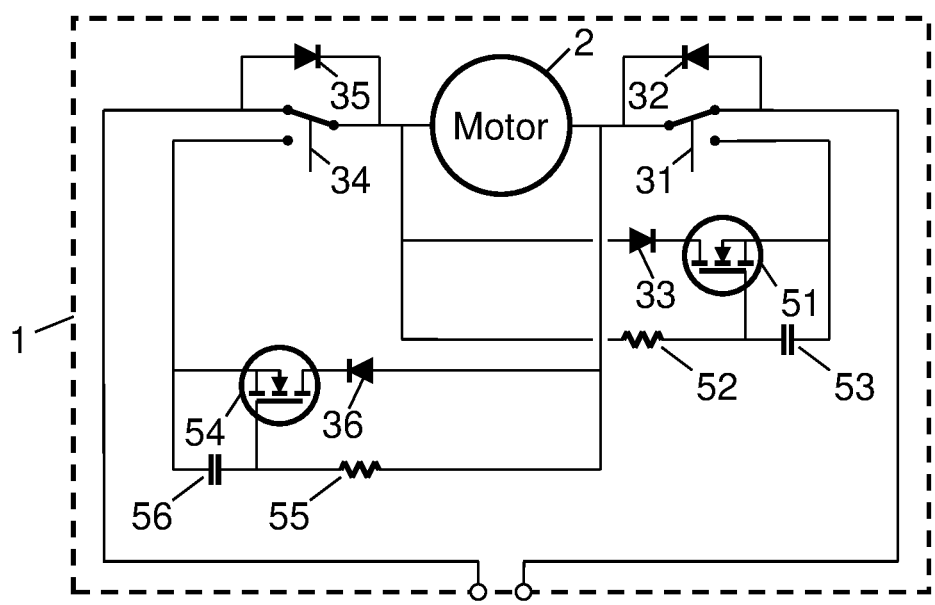
FIG. 32 shows a linear actuator with the circuit of FIG. 29 arranged in both end positions.

The circuit shown in FIG. 29 and described above has an end stop switch 31 arranged in relation to one of the end positions of the spindle nut 6. However, as mentioned above, a similar end stop switch is typically arranged in relation to the other end position as shown in FIGS. 9, 10, 11 and 12, where the end stop switch 31 is activated when the spindle nut 6 reaches one of its end positions and the end stop switch 34 is activated when it reaches the other end position. The circuit shown in FIG. 29 can of course also be implemented in the circuits of FIGS. 9, 10, 11 and 12. As an example, FIG. 32 shows the implementation in the circuit of FIG. 9. A MOSFET 51, a resistor 52 and a capacitor 53 are arranged around the "short circuit" diode 33 as described above, and correspondingly, a MOSFET 54, a resistor 55 and a capacitor 56 are arranged around the "short circuit" diode 36. The function of the circuit is the same as described in relation to FIG. 29.

If the position of the two end stop switches 31 and 34 are interchanged, as it was shown in FIG. 12, so that also the direction of the four diodes 32, 33, 35 and 36 have been changed, the circuit of FIG. 32 can be implemented with P-channel MOSFETs instead of the N-channel MOSFETs used in FIG. 32.

In other words, there is disclosed a linear actuator 1 comprising a reversible electric DC motor 2; a spindle 4 driven by said reversible DC motor 2; a spindle nut 6 mounted on the spindle 4 and secured against rotation, said spindle nut 6 being arranged to be moved between two end positions; at least one end stop switch 31; 34 arranged to be activated when the spindle nut 6 is in an end position, wherein the end stop switch 31, 34 in its activated state is configured to disconnect the current for the DC motor 2 and to connect a first diode 33; 36 across the DC motor 2 for short circuiting a current resulting from a back electromotive force produced by the DC motor 2, when the motor current is interrupted; a second diode 32; 35 connected over said end stop switch 31; 34 for enabling the DC motor 2 to drive the spindle nut 6 out of said end position; and at least one additional component 43; 44; 45; 46; 48; 50; 51; 54 connected in series with said first diode 33; 36 so that the additional component can conduct a current in the same direction as the first diode 33; 36 while providing a voltage drop over itself.

The additional component in series with the first diode, i.e. the diode for short circuiting the DC motor 2 when the motor current is interrupted by the end stop switch, reduces or even eliminates the part of the motor current circulating through this diode during pulse pauses while the spindle nut is driven out of an end position by a pulse width modulated voltage delivered to the actuator via a cable from a control box. The reduced or eliminated current in the first diode during pulse pauses reduces or eliminates the effect of the reverse recovery time of the diode, so that current spikes caused by this effect and the related electric noise problems are also reduced or eliminated.

In an embodiment, the additional component is a component 43; 44; 45; 46; 48 configured to provide a voltage drop over itself when conducting current that at least corresponds to one diode voltage drop. In this way, the additional component at least compensates for a corresponding diode voltage drop in the alternative path for the circulating motor current through a cable and a control box. This can be achieved when the additional component is a diode 43; 48, a Zener diode 44, a bipolar transistor 45 having its base and collector terminals connected together, or a field effect transistor 46 having its gate and source terminals connected together.

In this case, the effect of the current spikes caused by the reverse recovery time of the first diode can be further reduced when an inductor 47; 49 is connected in series with said first diode 33; 36 and said additional component. The inductor 47; 49 may have a self-inductance in the range 1-100 μH, such as 10 μH.

In an embodiment, the additional component is an inductor 50. This reduces the level of the current spikes and thus the related electric noise problems. The inductor 50 may have a self-inductance in the range 1-100 μH, such as 10 μH.

Thus, there is disclosed a linear actuator 1 comprising a reversible electric DC motor 2; a spindle 4 driven by said reversible DC motor 2; a spindle nut 6 mounted on the spindle 4 and secured against rotation, said spindle nut 6 being arranged to be moved between two end positions; at least one end stop switch 31; 34 arranged to be activated when the spindle nut 6 is in an end position, wherein the end stop switch 31, 34 in its activated state is configured to disconnect the current for the DC motor 2 and to connect a first diode 33; 36 across the DC motor 2 for short circuiting a current resulting from a back electromotive force produced by the DC motor 2, when the motor current is interrupted; a second diode 32; 35 connected over said end stop switch 31; 34 for enabling the DC motor 2 to drive the spindle nut 6 out of said end position; and an inductor 50 connected in series with said first diode 33; 36.

In an embodiment, the additional component is a field effect transistor 51; 54 having its drain terminal connected to a first end of said first diode 33; 36 and its gate terminal connected to a midpoint of an RC circuit, wherein the RC circuit comprises a capacitor 53; 56 connected to the source terminal of the field effect transistor 51; 54 and a resistor 52; 55 connected to the other end of said first diode 33; 36. This circuit prevents the first diode 33; 36 from conducting any current during the pulse pauses while the spindle nut is driven out of an end position, and thus no current spikes are generated. The RC circuit may be designed with a time constant in the range of 100 μs to 1 ms.

Thus, there is disclosed a linear actuator 1 comprising a reversible electric DC motor 2; a spindle 4 driven by said reversible DC motor 2; a spindle nut 6 mounted on the spindle 4 and secured against rotation, said spindle nut 6 being arranged to be moved between two end positions; at least one end stop switch 31; 34 arranged to be activated when the spindle nut 6 is in an end position, wherein the end stop switch 31, 34 in its activated state is configured to disconnect the current for the DC motor 2 and to connect a first diode 33; 36 across the DC motor 2 for short circuiting a current resulting from a back electromotive force produced by the DC motor 2, when the motor current is interrupted; a second diode 32; 35 connected over said end stop switch 31; 34 for enabling the DC motor 2 to drive the spindle nut 6 out of said end position; and a field effect transistor 51; 54 connected in series with said first diode 33; 36, said field effect transistor 51; 54 having its drain terminal connected to a first end of said first diode 33; 36 and its gate terminal connected to a midpoint of an RC circuit, wherein the RC circuit comprises a capacitor 53; 56 connected to the source terminal of the field effect transistor 51; 54 and a resistor 52; 55 connected to the other end of said first diode 33; 36.

The linear actuator may comprise a first end stop switch 31 arranged to be activated when the spindle nut 6 is in one of the two end positions and a second end stop switch 34 arranged to be activated when the spindle nut 6 is in the other end position, wherein each end stop switch in its activated state is configured to disconnect the current for the DC motor 2 and to connect a first diode 33; 36 across the DC motor 2 for short circuiting a current resulting from a back electromotive force produced by the DC motor 2 when the motor current is interrupted; a second diode 32; 35 connected over each of said end stop switches for enabling the DC motor 2 to drive the spindle nut 6 out of said end position, and at least one additional component 43; 44; 45; 46; 48; 50; 51; 54 connected in series with each one of said first diodes 33, 36 so that the additional component can conduct a current in the same direction as the first diode while providing a voltage drop over itself. In this way, the electric noise problem can be solved in both end positions of the spindle nut.

An actuator system may comprise a linear actuator as described above; a control box 13 comprising at least a power supply 15 and a driver circuit 14 comprising four electronic switches 22, 23, 24, 25 arranged as a H bridge, said driver circuit 14 being configured to drive the DC motor 2 of the linear actuator 1 with a pulse width modulated voltage; and a cable 12 connecting the linear actuator 1 to the driver circuit 14 in the control box 13. In this way, the actuator system benefits from the described advantages of the linear actuator. The actuator system may further comprise a remote control 17 connected to the driver circuit 14.

Although various embodiments of the present invention have been described and shown, the invention is not restricted thereto, but may also be embodied in other ways within the scope of the subject-matter defined in the following claims.

The invention claimed is:

1. A linear actuator (1) comprising:
   a reversible electric DC motor (2);
   a spindle (4) driven by said reversible DC motor (2);
   a spindle nut (6) mounted on the spindle (4) and secured against rotation, said spindle nut (6) being arranged to be moved between two end positions;
   at least one end stop switch (31; 34) arranged to be activated when the spindle nut (6) is in an end position, wherein the end stop switch (31; 34) in its activated state is configured to disconnect the current for the DC motor (2) and to connect a first diode (33; 36) across the DC motor (2) for short circuiting a current resulting from a back electromotive force produced by the DC motor (2), when the motor current is interrupted;
   a second diode (32; 35) connected over said end stop switch (31; 34) for enabling the DC motor (2) to drive the spindle nut (6) out of said end position; and
   at least one additional component (43; 44; 45; 46; 48; 50; 51; 54) connected in series with said first diode (33; 36) so that the additional component can conduct a current in the same direction as the first diode (33; 36) while providing a voltage drop over itself.

2. The linear actuator according to claim 1, wherein the additional component is a component (43; 44; 45; 46; 48) configured to provide a voltage drop over itself when conducting current that at least corresponds to one diode voltage drop.

3. The linear actuator according to claim 2, wherein the additional component is a diode (43; 48).

4. The linear actuator according to claim 2, wherein the additional component is a Zener diode (44).

5. The linear actuator according to claim 2, wherein the additional component is a bipolar transistor (45) having its base and collector terminals connected together.

6. The linear actuator according to claim 2, wherein the additional component is a field effect transistor (46) having its gate and source terminals connected together.

7. The linear actuator according to claim 2, wherein an inductor (47; 49) is connected in series with said first diode (33; 36) and said additional component.

8. The linear actuator according to claim 1, wherein the additional component is an inductor (50).

9. The linear actuator according to claim 1, wherein the additional component is a field effect transistor (51; 54) having its drain terminal connected to a first end of said first diode (33; 36) and its gate terminal connected to a midpoint of an RC circuit, wherein the RC circuit comprises a capacitor (53; 56) connected to the source terminal of the field effect transistor (51; 54) and a resistor (52; 55) connected to the other end of said first diode (33; 36).

10. The linear actuator according to claim 1, wherein the linear actuator comprises:
   a first end stop switch (31) arranged to be activated when the spindle nut (6) is in one of the two end positions and a second end stop switch (34) arranged to be activated when the spindle nut (6) is in the other end position, wherein each end stop switch in its activated state is configured to disconnect the current for the DC motor (2) and to connect a first diode (33; 36) across the DC motor (2) for short circuiting a current resulting from a back electromotive force produced by the DC motor (2) when the motor current is interrupted;
   a second diode (32; 35) connected over each of said end stop switches for enabling the DC motor (2) to drive the spindle nut (6) out of said end position, and
   at least one additional component (43; 44; 45; 46; 48; 50; 51; 54) connected in series with each one of said first diodes (33, 36) so that the additional component can conduct a current in the same direction as the first diode while providing a voltage drop over itself.

11. An actuator system (11) comprising:
   a linear actuator (1) according to claim 1;
   a control box (13) comprising at least a power supply (15) and a driver circuit (14) comprising four electronic switches (22, 23, 24, 25) arranged as a H bridge, said driver circuit (14) being configured to drive the DC motor (2) of the linear actuator (1) with a pulse width modulated voltage; and
   a cable (12) connecting the linear actuator (1) to the driver circuit (14) in the control box (13).

* * * * *